(12) United States Patent
Lawrence et al.

(10) Patent No.: US 7,664,734 B2
(45) Date of Patent: Feb. 16, 2010

(54) SYSTEMS AND METHODS FOR GENERATING MULTIPLE IMPLICIT SEARCH QUERIES

(75) Inventors: Stephen R. Lawrence, Mountain View, CA (US); Niniane Wang, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 860 days.

(21) Appl. No.: 10/814,908

(22) Filed: Mar. 31, 2004

(65) Prior Publication Data

US 2008/0077558 A1    Mar. 27, 2008

(51) Int. Cl.
G06F 17/30    (2006.01)
(52) U.S. Cl. .......................... 707/3; 707/100; 707/101; 707/102
(58) Field of Classification Search ............ 707/3, 707/100–102
See application file for complete search history.

(56) References Cited

U.S. PATENT DOCUMENTS

| 5,418,948 | A | 5/1995 | Turtle |
| 5,678,038 | A | 10/1997 | Dockter et al. |
| 5,696,962 | A | 12/1997 | Kupiec |
| 5,701,469 | A | 12/1997 | Brandli et al. |
| 5,717,913 | A | 2/1998 | Driscoll |
| 5,754,938 | A | 5/1998 | Herz et al. |
| 5,826,261 | A | 10/1998 | Spencer |
| 5,890,152 | A | 3/1999 | Rapaport et al. |
| 5,911,139 | A | 6/1999 | Jain et al. |
| 5,933,827 | A | 8/1999 | Cole et al. |
| 5,940,821 | A | 8/1999 | Wical |
| 5,964,839 | A | 10/1999 | Johnson et al. |
| 5,987,446 | A | 11/1999 | Corey et al. |
| 6,006,222 | A | 12/1999 | Culliss |
| 6,012,067 | A | 1/2000 | Sarkar |
| 6,014,665 | A | 1/2000 | Culliss |
| 6,070,158 | A | 5/2000 | Kirsch et al. |
| RE36,727 | E | 6/2000 | Kageneck et al. |
| 6,078,916 | A | 6/2000 | Culliss |
| 6,112,203 | A | 8/2000 | Bharat et al. |
| 6,122,647 | A | 9/2000 | Horowitz et al. |
| 6,167,434 | A | 12/2000 | Pand |
| 6,182,068 | B1 | 1/2001 | Culliss |
| 6,199,059 | B1 | 3/2001 | Dahan et al. |
| 6,272,507 | B1 | 8/2001 | Pirolli et al. |
| 6,321,228 | B1 | 11/2001 | Crandall et al. |
| 6,397,221 | B1 | 5/2002 | Greef et al. |

(Continued)

OTHER PUBLICATIONS

Berlin, J., et al., "Database Schema Matching Using Machine Learning with Feature Selection," Caise 2002, LNCS 2348, pp. 452-466, http://www.springerlink.com/contant/73u6cpt0qek8rgh0/.

(Continued)

*Primary Examiner*—Sana Al-Hashemi
(74) *Attorney, Agent, or Firm*—Fenwick & West LLP

(57) ABSTRACT

Systems and methods for generating multiple implicit search queries are described. In one described system, a query system receives a user context attribute and generates a plurality of implicit search queries based at least in part on the user context attribute. The query system then receives result sets associated with each of the plurality of implicit search queries and combines the results for display to a user.

44 Claims, 12 Drawing Sheets

U.S. PATENT DOCUMENTS

| | | |
|---|---|---|
| 6,421,675 B1 | 7/2002 | Ryan et al. |
| 6,460,036 B1 | 10/2002 | Herz |
| 6,490,575 B1 | 12/2002 | Berstis |
| 6,505,191 B1 | 1/2003 | Baclawski |
| 6,546,388 B1 | 4/2003 | Edlund et al. |
| 6,571,234 B1 | 5/2003 | Knight et al. |
| 6,581,056 B1 | 6/2003 | Rao |
| 6,583,798 B1 | 6/2003 | Hoek et al. |
| 6,587,856 B1 | 7/2003 | Srinivasan et al. |
| 6,602,300 B2 | 8/2003 | Ushioda et al. |
| 6,633,868 B1 | 10/2003 | Min et al. |
| 6,665,666 B1 | 12/2003 | Brown et al. |
| 6,687,704 B1 | 2/2004 | Russell |
| 6,697,799 B1 | 2/2004 | Neal et al. |
| 6,697,840 B1 | 2/2004 | Godefroid et al. |
| 6,745,178 B1 | 6/2004 | Emens et al. |
| 6,766,320 B1 | 7/2004 | Wang et al. |
| 6,772,188 B1 | 8/2004 | Cloutier |
| 6,778,951 B1 | 8/2004 | Contractor |
| 6,785,671 B1 | 8/2004 | Bailey et al. |
| 6,795,825 B2 | 9/2004 | Rishe |
| 6,803,906 B1 | 10/2004 | Morrison et al. |
| 6,820,093 B2 | 11/2004 | de la Huerga |
| 6,820,237 B1 | 11/2004 | Abu-Hakima et al. |
| 6,834,287 B1 | 12/2004 | Fold-Williams et al. |
| 6,850,934 B2 | 2/2005 | Bates et al. |
| 6,853,998 B2 | 2/2005 | Biebesheimer et al. |
| 6,874,126 B1 | 3/2005 | Lapidous |
| 6,925,456 B2 | 8/2005 | Nakano et al. |
| 6,948,134 B2 | 9/2005 | Gauthier et al. |
| 6,950,791 B1 | 9/2005 | Bray et al. |
| 6,961,910 B2 | 11/2005 | Lee et al. |
| 6,961,954 B1 | 11/2005 | Maybury et al. |
| 6,963,830 B1 | 11/2005 | Nakao |
| 6,976,053 B1 | 12/2005 | Tripp et al. |
| 6,976,090 B2 | 12/2005 | Ben-Shaul et al. |
| 7,007,085 B1 | 2/2006 | Malik |
| 7,022,905 B1 | 4/2006 | Hinman et al. |
| 7,027,975 B1 | 4/2006 | Pazandak et al. |
| 7,032,174 B2 | 4/2006 | Montero et al. |
| 7,043,492 B1 | 5/2006 | Neal et al. |
| 7,054,860 B2 | 5/2006 | Inaba et al. |
| 7,054,870 B2 | 5/2006 | Holbrook |
| 7,062,442 B2 | 6/2006 | Berg et al. |
| 7,082,428 B1 | 7/2006 | Denny et al. |
| 7,099,860 B1 | 8/2006 | Liu et al. |
| 7,146,399 B2 | 12/2006 | Fox et al. |
| 7,162,473 B2 | 1/2007 | Dumais |
| 7,171,352 B2 | 1/2007 | Chang et al. |
| 7,181,459 B2 | 2/2007 | Grant et al. |
| 7,194,455 B2 | 3/2007 | Zhou et al. |
| 7,194,485 B2 | 3/2007 | Kaipa et al. |
| 7,231,395 B2 | 6/2007 | Fain et al. |
| 7,293,014 B2 | 11/2007 | Subramaniam et al. |
| 7,293,015 B2 | 11/2007 | Zhou |
| 7,305,129 B2 | 12/2007 | Chellapilla et al. |
| 7,318,049 B2 | 1/2008 | Iannacci |
| 7,412,708 B1 | 8/2008 | Khan et al. |
| 7,421,645 B2 | 9/2008 | Reynar |
| 7,437,353 B2 | 10/2008 | Marmaros et al. |
| 7,451,136 B2 | 11/2008 | Chua et al. |
| 7,478,089 B2 | 1/2009 | Henkin et al. |
| 2001/0037328 A1 | 11/2001 | Pustejovsky et al. |
| 2002/0016786 A1 | 2/2002 | Pitkow et al. |
| 2002/0040311 A1 | 4/2002 | Douglass et al. |
| 2002/0059272 A1 | 5/2002 | Porter |
| 2002/0065800 A1 | 5/2002 | Morlitz |
| 2002/0095427 A1 | 7/2002 | Kaplan |
| 2002/0099700 A1 | 7/2002 | Li |
| 2002/0103698 A1 | 8/2002 | Cantrell |
| 2002/0103737 A1 | 8/2002 | Briere |
| 2002/0103806 A1 | 8/2002 | Yamanoue |
| 2002/0116291 A1 | 8/2002 | Grasso et al. |
| 2002/0129059 A1 | 9/2002 | Eck |
| 2002/0174101 A1 | 11/2002 | Fernley et al. |
| 2003/0014398 A1 | 1/2003 | Ohta |
| 2003/0020749 A1 | 1/2003 | Abu-Hakima et al. |
| 2003/0033296 A1 | 2/2003 | Rothmuller et al. |
| 2003/0046311 A1 | 3/2003 | Baidya et al. |
| 2003/0055831 A1 | 3/2003 | Ryan et al. |
| 2003/0069877 A1 | 4/2003 | Grefenstette et al. |
| 2003/0079185 A1 | 4/2003 | Katariya et al. |
| 2003/0093276 A1 | 5/2003 | Miller et al. |
| 2003/0093790 A1 | 5/2003 | Logan et al. |
| 2003/0115552 A1 | 6/2003 | Jahnke et al. |
| 2003/0123443 A1 | 7/2003 | Anwar |
| 2003/0130982 A1 | 7/2003 | Kasriel et al. |
| 2003/0135490 A1 | 7/2003 | Barrett et al. |
| 2003/0135499 A1 | 7/2003 | Schirmer et al. |
| 2003/0154071 A1 | 8/2003 | Shreve |
| 2003/0158855 A1 | 8/2003 | Farnham et al. |
| 2003/0167266 A1 | 9/2003 | Saldanha et al. |
| 2003/0220913 A1 | 11/2003 | Doganata et al. |
| 2004/0001104 A1 | 1/2004 | Sommerer et al. |
| 2004/0003097 A1 | 1/2004 | Willis et al. |
| 2004/0030741 A1 | 2/2004 | Wolton et al. |
| 2004/0036716 A1 | 2/2004 | Jordahl |
| 2004/0059564 A1 | 3/2004 | Zhou |
| 2004/0064447 A1 | 4/2004 | Simske et al. |
| 2004/0073534 A1 | 4/2004 | Robson |
| 2004/0122656 A1 | 6/2004 | Abir |
| 2004/0133560 A1 | 7/2004 | Simske |
| 2004/0139106 A1 | 7/2004 | Bachman et al. |
| 2004/0143569 A1 | 7/2004 | Gross et al. |
| 2004/0225667 A1 | 11/2004 | Hu et al. |
| 2004/0267700 A1 | 12/2004 | Dumais et al. |
| 2004/0267730 A1 | 12/2004 | Dumais et al. |
| 2004/0267813 A1 | 12/2004 | Rivers-Moore et al. |
| 2005/0065909 A1 | 3/2005 | Musgrove et al. |
| 2005/0114306 A1 | 5/2005 | Shu et al. |
| 2005/0125382 A1 | 6/2005 | Karnawat et al. |
| 2005/0125390 A1 | 6/2005 | Hurst-Hiller et al. |
| 2005/0198026 A1 | 9/2005 | Dehlinger et al. |
| 2005/0222987 A1 | 10/2005 | Vadon |
| 2005/0262073 A1 | 11/2005 | Reed |
| 2006/0010150 A1 | 1/2006 | Shaath et al. |
| 2006/0136405 A1 | 6/2006 | Ducatel et al. |
| 2007/0208697 A1* | 9/2007 | Subramaniam et al. ......... 707/3 |

OTHER PUBLICATIONS

Brill, E., "A Simple Rule-Based Part of Speech Tagger," Department of Computer Science, University of Pennsylvania, 1992, pp. 1-5.

Claypool, M., et al., "Inferring User Interest," IEEE Internet Computing, 2001, pp. 1-17, vol. 5, No. 6, located at http://web.cs.wpi.edu/~claypool/papers/iui/iui.pdf.

Czerwinski, M., et al., "Visualizing Implicit Queries for Information Management and Retrieval," ACM CHI '99, May 15-20, 1999, pp. 560-567.

Knezevic, P. et al., "The Architecture Of The Obelix—An Improved Internet Search Engine," Proceedings of the 33$^{rd}$ Annual Hawaii International Conference on System Sciences (HICSS) Jan. 4-7, 2000, Maui, HI, USA, pp. 2145-2155.

Li, W., et al., "Semantic Integration in Heterogeneous Databases Using Neural Networks," Proceedings of the 20$^{th}$ International Conference on Very Large Data Bases, Sep. 12-15, 1994, pp. 1-12, Morgan Kaufmann Publishers, San Francisco, CA.

Li, W., et al., "SEMINT: A Tool for Identifying Attribute Correspondences in Heterogeneous Databases Using Neural Networks," Data Knowl. Eng., Apr. 2000, pp. 484, vol. 33, No. 1, http://dx.doi.org/10.1016/S0169-023X(99)00044-0.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

Phelps, A., "All You Can Seek," Special Services, Jul. 1999, vol. 7, Iss. 7, [online] [Retrieved on Oct. 16, 2006] Retrieved from the Internet: http://www.smartcomputing.com/editorial/article.asp?article=articles/archive/g0707/26g07/26g07.asp.

Scha, R., et al., "An Augmented Context Free Grammar for Discourse," Proceedings of the 12th Conference on Computational Linguistics—vol. 2, Computational Linguistics, Aug. 22-27, 1988, pp. 573-577, Morristown, NJ, http://dx.doi.org/10.3115/991719.991756.

International Search Report and Written Opinion, PCT/US2004/038562, Apr. 6, 2005, 12 pages.

U.S. Appl. No. 10/749,440, filed Dec. 31, 2003, Badros et al.

80-20 Software—Products—80-20 One Search, http://www.80-20.com/products/one-search/retriever.asp, printed Mar. 16, 2004.

"askSam™ Making Information Useful," askSam,—Organize your information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J., et al., "A Machine Learning Architecture for Optimizing Web Search Engines," School of Computer Science, Carnegie Mellon University, May 10, 1996, pp. 1-8.

Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

DEVONthink, http://www.devon-techonologies.com/products/devonthink.php, printed Mar. 16, 2004.

dtSearch®—http://www.dtsearch.com/, printed Mar. 15, 2004.

Dumais, S., et al, "Stuff I've Seen: A System for Personal Information Retrieval and Re-Use," Microsoft Research, *SIGIR'03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e..., pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—Home Page, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4, 2000, pp. 685-704.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998, pp. 1-2.

WebWatcher Home Page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 instantly searches files & email. For outlook, Outlook, http://www.x1.com/, printed Mar. 15, 2004.

Zellweger, P., et al., "Fluid Links for Informed and Incremental Link Transitions," Proceedings of Hypertext'98, Pittsburgh, PA, Jun. 20-24, 1998, pp. 50-57.

Czerwinski, M., et al. "Visualizing Implicit Queries for Information Management and Retrieval," CHI 99, May 15-20, 1999, ACM, pp. 560-567.

Garofalakis, M., et al., "XTRACT: A System for Extracting Document Type Descriptors from XML Documents," Sigmod, ACM, Jun. 2000, p. 165-176, vol. 29, No. 2.

Horvitz, E., et al., "The Lumiere project: Bayesian user modeling for inferring the goals and needs of software users", Proceedings of the Fourteenth Conference on Uncertainty, 1998, pp. 256-265, Morgan Kaufmann: San Francisco.

Joho, H., et al., "A Study of User Interaction with a Concept-Based Interactive Query Expansion Support Tool," Advances in Information Retrieval, A Study of User Interaction, Lecture Notes in Computer Science, Mar. 2, 2004, pp. 42-56, vol. 2997.

Jones, G., et al., "Context-Aware Retrieval for Ubiquitous Computing Environments," Mobile and Ubiquitous Information Access, Lecture Notes in Computer Science, Jan. 27, 2004, pp. 227-243, vol. 2954.

Shedherd, M., et al., "Browsing and Keyword-Based Profiles: A Cautionary Tale," Proceedings of the 34th Hawaii International Conference on System Sciences, Jan. 3-6, 2001, pp. 1365-1373.

White, R., et al., "The Use of Implicit Evidence for Relevance Feedback in Web Retrieval," Lecture Notes in Computer Science, Jan. 1, 2002, pp. 93-109, vol. 2291.

\* cited by examiner

SYSTEMS AND METHODS FOR GENERATING MULTIPLE IMPLICIT SEARCH QUERIES

RELATED APPLICATION

This application relates to:

Application No. 10/814,871, filed herewith, titled "Systems and Methods for Extracting a Keyword from an Event";

Application No. 10/815,074, filed herewith, titled "Systems and Methods for Weighting a Search Query Results";

Application No. 10/814,056, filed herewith, titled "Systems and Methods for Refreshing a Content Display";

Application No. 10/814,368, filed herewith, titled "Systems and Methods for Constructing and Using a User Profile";

Application No. 10/814,365, filed herewith, titled "Systems and Methods for Identifying a Named Entity";

Application No. 10/815,150, filed herewith, titled "Systems and Methods for Analyzing Boilerplate";

Application No. 10/814,053, filed herewith, titled "Systems and Methods for Associating a Keyword with a User Interface Area";

Application No. 10/813,875, filed herewith, titled "Systems and Methods for Ranking Implicit Search Results";

Application No. 10/814,052, filed herewith, titled "Systems and Methods for Generating a User Interface"; and Application No. 10/814,924 filed herewith, titled "Systems and Methods for Providing Search Results,"

the entirety of all of which are incorporated herein by reference.

FIELD OF THE INVENTION

The present invention relates generally to methods and systems for information retrieval. The present invention relates particularly to systems and methods for generating multiple implicit search queries.

BACKGROUND

Conventional search engines receive a search query from a user and execute a search against a global index. Such conventional search engines typically use one or more conventional methods for performing a search. For example, one known method, described in an article entitled "The Anatomy of a Large-Scale Hypertextual Search Engine," by Sergey Brin and Lawrence Page, assigns a degree of importance to a document, such as a web page, based on the link structure of the web. The search results are often presented in a list format, comprising article identifiers and brief snippets about the documents in a web page that can be resized.

Often, the user has access to other information stored on the user's local machine or on other storage media accessible via a network that is relevant to the user's current contextual state. For example, if a user is working on a document regarding a particular subject, information about the subject may be stored on the user's hard drive or in a global index accessible to the user. In order to access this information, the user issues an explicit search query in an application, such as a web search page. The information is provided to the user as a result set. Thus, the user shifts focus from the document that the user is working on to perform the search.

In many cases, the user may be unaware or may not remember that information is available regarding a particular subject. In such a case, the user may not perform an explicit search and thus, will not have access to the potentially relevant information.

SUMMARY

Embodiments of the present invention provide systems and methods for generating multiple implicit search queries. In one embodiment, a query system receives an input signal associated with a user context attribute, generates a first search query based on the input signal, generates a second search query based on the input signal, causes the first search query to be executed, and causes the second search query to be executed. The query system then receives a first result set associated with the first search query, receives a second result set associated with the second search query, and combines the first result set with the second result set.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
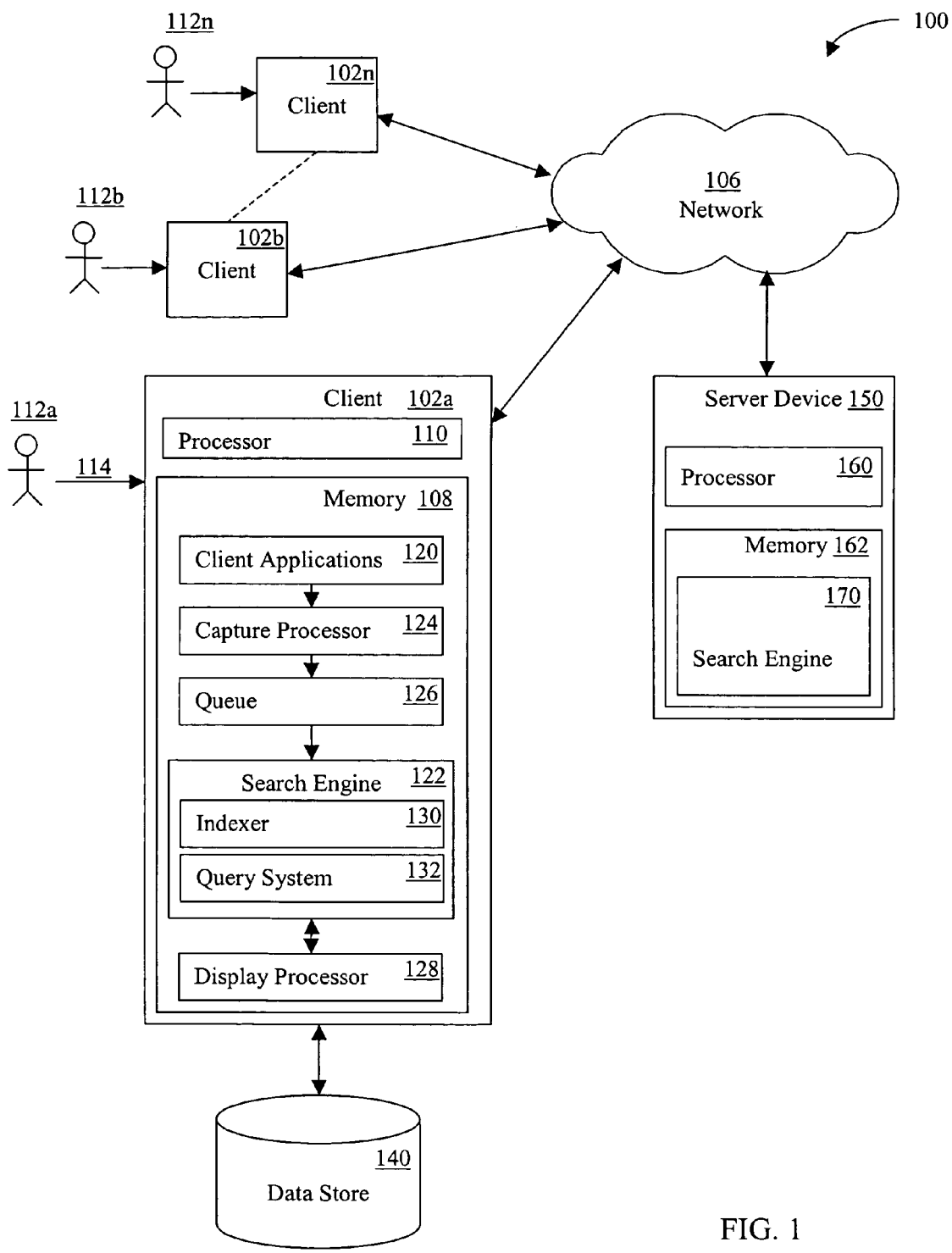
FIG. 1 is a block diagram illustrating an exemplary environment in which one embodiment of the present invention may operate.

Embodiments of the present invention provide systems and methods for generating multiple implicit queries. Exemplary embodiments are described below. Referring now to the drawings in which like numerals indicate like elements throughout the several figures, FIG. 1 is a block diagram illustrating an exemplary environment for implementation of an embodiment of the present invention. While the environment shown reflects a client-side search engine architecture embodiment, other embodiments are possible.

The system 100 shown in FIG. 1 includes multiple client devices 102a-n in communication with a server device 150 over a wired or wireless network 106. The network 106 shown comprises the Internet. In other embodiments, other networks, such as an intranet, may be used instead. Moreover, methods according to the present invention may operate within a single client device.

The client devices 102a-n shown each includes a computer-readable medium 108. The embodiment shown includes a random access memory (RAM) 108 coupled to a processor 110. The processor 110 executes computer-executable program instructions stored in memory 108. Such processors may include a microprocessor, an ASIC, a state machine, or other processor, and can be any of a number of computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be connected to a network 106 as shown, or can be stand-alone machines. Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any operating system, such as Microsoft® Windows® or Linux, capable of supporting one or more client application programs. For example, the client device 102a shown comprises a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, and any other application capable of being executed by a client device.

The user 112a can interact with the various client applications 120 and articles associated with the client applications 120 via various input and output devices of the client device 102a. Articles include, for example, word processor, spreadsheet, presentation, email, instant messenger, database, and other client application program content files or groups of files, web pages of various formats, such as HTML, XML, XHTML, Portable Document Format (PDF) files, and audio files, video files, or any other documents or groups of documents or information of any type whatsoever.

The memory 108 of the client device 102a shown also contains a capture processor 124, a queue 126, and a search engine 122. The client device 102a shown also contains or is in communication with a data store 140. The search engine 122 can receive an explicit query from the user 112a or generate an implicit query and retrieve information from the data store 140 in response to the query.

The search engine 122 shown contains an indexer 130, a query system 132, and a formatter 134. Events, real-time and historical, contextual and indexable, and performance data can be sent by the queue 126 to the query system 132 to provide the query system 132 with information concerning the current user context. The query system 132 can use this information to generate an implicit query. The query system 132 can also receive and process explicit queries from the user 112a.

The data store 140 can be any type of computer-readable media and can be integrated with the client device 102a, such as a hard drive, or external to the client device 102a, such as an external hard drive or on another data storage device accessed through the network 106. The data store 140 may include any one or combination of methods for storing data, including without limitation, arrays, hash tables, lists, and pairs.

In the embodiment shown in FIG. 1, a user 112a can input an explicit query into a search engine interface displayed on the client device 102a, which is received by the search engine 122. The search engine 122 can also generate an implicit query based on a current user context or state, which can be determined by the query system 132 from contextual real time events. Based on the query, the query system 132 can locate relevant information in the data store 140 and provide a result set.

The data store 140 comprises a local index. The local index in the embodiment shown in FIG. 1 may comprise information, such as articles, which are associated with the client device 102a, a user 112a of the client device 102a, or a group of users of the client device 102a. For example, the local index in the data store 140 shown in FIG. 1 may comprise an index of articles created, edited, received, or stored by the client user 112a using the client machine 102a, or articles otherwise associated with the client user 102a or the client machine 112a. The local index may be stored in a client machine, such as in data store 140, in a data store on a local network in a manner accessible by the client machine, on a server accessible to the client machine through the Internet, or in another accessible location.

In contrast, a global index may comprise information relevant to many users or many servers, such as, for example, an index of web pages located on multiple servers in communication with the World Wide Web. One example of a global index is an index used by the Google(TM) search engine to provide search results in response to a search query.

A single index may comprise both a local and a global index. For example, in one embodiment, an index may comprise both local and global information, and include a user or client identifier with the local information so that it may be identified with the user(s) or client(s) to which it pertains.

Moreover, an index, local or global, may be present in one or multiple logical or physical locations.

In one embodiment, the result set comprises article identifiers identifying articles associated with the client applications 120 or client articles. Client articles stored in the data store 140 include articles associated with the user 112a or client device 102a, such as the word processing documents, previously viewed web pages and any other article associated with the client device 102a or user 112a. In another embodiment, the result set also comprises identifiers identifying articles located on the network 106 or network articles located by a search engine on a server device. Network articles include articles located on the network 106 not previously viewed or otherwise referenced by the user 112a, such as web pages not previously viewed by the user 112a.

The result sets comprise one or more article identifiers. An article identifier may be, for example, a Uniform Resource Locator (URL), a file name, a link, an icon, a path for a local file, or anything else that identifies an article. In the embodiment shown, an article identifier comprises a URL associated with an article.

Messaging articles stored in the data store 140 include user's emails, chat messages, and instant messaging messages. Each time a message is received, sent, modified, printed, or otherwise accessed, a record is stored in the data store 140. This information can later be searched to identify messages that should be displayed in the user interface.

An embodiment of the present invention may also store message threads in the data store 140. In such an embodiment, messages are related together by various attributes, including, for example, the sender, recipient, date/time sent and received, the subject, the content, or any other attribute of the message. The related messages can then be retrieved as a thread, which may be treated as a document by the display processor 128.

The formatter 134 can receive the search result set from the query system 132 of the search engine 122 and can format the results for output to a display processor 128. In one embodiment, the formatter 134 formats the results in XML or HTML. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. In various embodiments, the functions described herein may be performed by various other components and devices.

Through the client devices 102a-n, users 112a-n can communicate over the network 106, with each other and with other systems and devices coupled to the network 106. As shown in FIG. 1, a server device 150 is also coupled to the network 106. In the embodiment shown, the search engine 122 can transmit a search query comprised of an explicit or implicit query or both to the server device 150. The user 112a can also enter a search query in a search engine interface, which can be transmitted to the server device 150. In another embodiment, the query signal may instead be sent to a proxy server (not shown), which then transmits the query signal to server device 150. Other configurations are also possible.

The server device 150 shown includes a server executing a search engine application program, such as the Google™ search engine. Similar to the client devices 102a-n, the server device 150 shown includes a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill.

Memory 162 contains the search engine application program, also known as a search engine 170. The search engine 170 locates relevant information in response to a search query from a client device 102a. The search engine 122 then provides the result set to the client device 102a via the network 106. The result set 134 comprises one or more article identifiers. An article identifier may be, for example, a URL, a file name, a link, an icon, a path for a local file, or anything else that identifies an article. In the embodiment shown, an article identifier comprises a URL associated with an article.

In the embodiment shown, the server device 150, or related device, has previously performed a crawl of the network 106 to locate articles, such as web pages, stored at other devices or systems connected to the network 106, and indexed the articles in memory 162 or on another data storage device.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to explain the exemplary methods shown in FIGS. 2 through 11.

Various methods may be implemented in the environment shown in FIG. 1 and other environments, according to the present invention. Methods according to the present invention may be implemented by, for example, a processor-executable program code stored on a computer-readable medium.

In one embodiment of the present invention, a program, such as query system 132, receives an input signal associated with a user context attribute. The user context attribute is intended to be broadly defined herein, and generally is an attribute that is associated with some aspect of the user's current interaction with a user interface or client computer. For example, the user context attribute may be associated with text the user is typing, an email that the user receives, or any other aspect of the user's interaction or experience with the computer. In response to receiving the context attribute, the query system 132 generates a plurality of implicit search queries, each of the queries based at least in part on the user context attribute. The query system causes the two queries to be executed and, in response, receives result sets associated with the implicit search queries. The query system combines the result sets and causes them to be output, for example, displayed to the user in a content display window. The content display window may comprise any suitable window or part thereof capable of displaying results to the user. For example, the content window may comprise a small browser-based window or a small window extending below the tool bar in a word-processing application.

The user context attribute may comprise, for example, the current word in a buffer, the last n words received from the user (e.g., the last 10 words the user typed), the text nearby the cursor (e.g., the text up to x words before and y words after the current cursor position), the current sentence, the current paragraph, an entire buffer (e.g., an entire word-processing document), a term measure, such as a term frequency or inverse document frequency measure, an identified term, such as an email address, the name of a person or an instant messaging buddy name, a previously copied term, a prior implicit or explicit search term, or a user identifier. It will be appreciated that other types of user context attributes could be used in various embodiments of the present invention.

The query system 132 may combine the results in numerous ways. For example, in one embodiment, the query system 132 merges the first result set with the second result set to create a combined result set. The query system 132 may then rank the combined result set based on some criteria. In another embodiment, the query system ranks the result sets based at least in part on a click-through value. In yet another embodiment, the query system 132 ranks the result set based at least in part on the user context attribute. For example, messages provided in the result set may be sorted by email address.

One embodiment of the present invention issues or stops issuing implicit queries based in part on user activity or lack thereof. For example, the query system 132 receives a signal indicating a user activity, such as the user sending an email; the query system 132 also receives an event associated with the user contextual state. The event may be related to the email or may be related to something else, such as a document on which the user has been working. For example, the user may click "Send" to send the email and then return to a word processing document and complete a sentence by typing a final word and a punctuation mark. Both the sending of the email and typing of the punctuation mark may trigger the generation of an event. The query system generates multiple implicit search queries in response to receiving the event(s), each of the queries based at least in part on the event(s). For example, the query system 132 may generate a search query for messages related to the recipient of the email message sent by the user and for documents related to keywords in the sentence that the user just completed. The query system 132 then submits the search queries to one or more global or local indices. For example, the query for messages may be executed by a local search engine application on an index of messages located on the user's machine while the second keyword query is submitted to the Google™ search engine. This example is merely illustrative; other types and combinations of queries of local and global indices may be performed.

In response, the query system 132 receives a result set associated with each of the search queries and ranks the results in each of the result sets based at least in part on the event. For example, if the event comprises the last sentence that the user typed, the query system may create two search queries. The first search query includes the entire sentence and is submitted to a local index, such as the user's hard drive, for searching. The second query includes two keywords from the sentence and is submitted to a global index, such as the Google™ search engine. Both queries are based on the activity of the user.

In one embodiment, the query system 132 receives the results from the indices and then ranks the result sets. The query system 132 may rank the result sets based on the event. For example, one event, such as the completion of a sentence, may be ranked more highly than another event, such as the sending of an email. The query system 132 may also rank the result sets based on other parameters, such as a click-through value. In addition, the query system 132 may filter out results that are currently being displayed to the user. For example, the query system 132 may store an identifier of the window currently in the display foreground, since the user is likely to already be aware of this information and thus, would not need to be reminded of it from a display of results from an implicit query.

Embodiments of the present invention are capable of generating implicit queries based on a user's contextual state. The results of an implicit query are displayed to the user in a content display window. The results may be updated periodically as the user's contextual state changes. For example, in one embodiment, the user is working on a word document concerning budgeting. A query implicit builder ("QUIB"), one component of the query system 132 shown in FIG. 1, requests and receives events related to the document. The QUIB generates queries from the events and presents the results of the queries to the user.

Events comprise historical, contextual, and real-time events. In one embodiment, contextual events are time sensitive. Contextual events relate to actions that are occurring now or have occurred within a short time frame, e.g., the last ten words that the user typed. In contrast, real-time events are less time-sensitive and may be of higher significance even after an elapsed period of time, e.g., the user printed or opened a file.

Events may be tracked over multiple sessions. For example, in one embodiment, if a user has opened a web page repeatedly during the last several times the user has used a client machine, the query system 132 tracks the usage for each of those sessions by tracking the events associated with the usage. In one such embodiment, access during a particular session is downweighted or promoted based on the period of time that has elapsed since the session. In other words, events associated with more recent accesses of a specific page are weighted more heavily than those occurring less recently.

The events may include information, such as the last twenty words the user typed, the last sentence the user typed, the text nearby the cursor (e.g., the text up to x words before and y words after), the currently active buffer (e.g., the entire active document), the selected or highlighted buffer, the buffer in the clipboard, or other information relevant to the user's context. The query system 132 extracts keywords from the information and generates a search query to be submitted to a search engine. The query system 132 creates and executes the query as if the user had explicitly typed the keywords in a search interface.

In one embodiment, the query system 132 learns from a user's behavior whether or not certain data streams or keywords are particularly relevant. The query system 132 may rely on click-throughs within the content display window to determine results in which the user exhibits particular interest. For example, if the content display includes a link that has been shown to a user multiple times but has not been clicked, the link may be eliminated from the content display. The data streams, query types, or keywords that resulted in the link being displayed may be downweighted in subsequent analysis. In contrast, if the user clicks the link, this typically indicates that the user was interested in the article, and can result in promoting the data streams, query types, or keywords that resulted in the link being displayed. These data streams, query types, or keywords would then be used with increased weight in subsequent analysis.

The query system 132 shown in FIG. 1 utilizes multiple data streams as sources for generating search queries. For example, if the user is editing a document, the query system 132 may use the last 20 words that were typed, as well as the entire document to extract keywords and generate search queries. The query system 132 generates a search query for each data stream and combines the result sets corresponding to each search query for display to the user.

Figure 2:
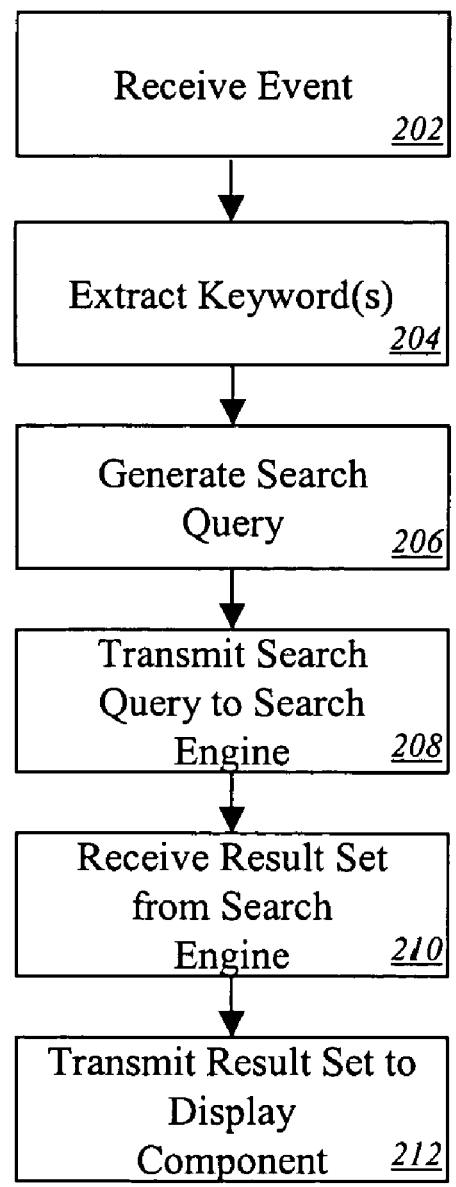
FIG. 2 is a flowchart illustrating a method for extracting keywords from an event in one embodiment of the present invention.

FIG. 2 is a flowchart illustrating a method for extracting keywords from an event in one embodiment of the present invention. In the embodiment of the present invention shown in FIG. 1, the query system 132 comprises a query implicit builder ("QUIB"). The query system 132 creates search queries based on the user's current contextual state. The query system 132 first receives a contextual event 202. The contextual event is an occurrence that is captured by the capture processor 124 and may be used to either update the user's contextual state and/or may be indexed and stored in the event database in data store 140 to provide information for future queries.

The query system 132 extracts keywords from the event in order to generate one or more search queries. The keywords may comprise words that the user has recently typed, words that occur in a document or buffer, or may comprise any other type of keyword that the system is able to identify. The keywords may comprise all of the words in the event. The query system 132 may extract a keyword from any of a number of data streams. For example, one embodiment of the present invention may use one or more of the following to extract implicit queries: (1) the most recently typed n words where n is on the order of ten; (2) the n words around the user's cursor where n is in the order of ten (e.g., x words before the cursor and y words after the cursor); (3) words in the current selection; (4) words from the current document (e.g., one such method selects the most frequently occurring words); (5) previous explicit queries executed by the user or submitted by the user; (6) clipboard content; (7) a list of all the names of people with which the user has communicated; (8) a list of email addresses and/or instant messenger "buddy names"; and (9) a list of important terms or phrases for the user.

For example, in one embodiment of the present invention, the query system 132 extracts keywords from an entire buffer, e.g., an entire Microsoft® Word document. In another embodiment of the present invention, the query system 132 extracts keywords based on a term frequency ("TF"). The term frequency refers to how frequently a term occurs within a document or within a data stream. In another embodiment, the query system 132 extracts the inverse document frequency ("IDF"), which is defined as the inverse of how often a term appears in documents in general. For example, the term "budget" may appear in a particular document twenty times. The TF of the term "budget" would be higher than the TF of a word that only occurs once in the document. The IDF of the term "budget" is also likely to be relatively high since the term is unlikely to appear in many documents in general. In contrast, the word "the" is likely to have a very high TF and a very low IDF since "the" occurs frequently in many documents and data streams.

In another embodiment of the present invention, the query system receives explicit queries that are captured by an application on the client 102a, such as a Winsock Layered Service Provider ("LSP"). When the user submits a query to a global index, such as the Google™ search engine, the Winsock LSP captures the query as an event and provides a query, either the original or a modified version, to another search engine application, such as search engine 122 on the client 102a. The local search engine 122 processes the query substantially simultaneously with the global search engine. When the query system 132 receives results from both search engines, it combines the results and creates a user interface element comprising the combined results.

In another embodiment of the present invention, the query system 132 notifies the display processor 128 when new results are ready. The display processor 128 issues an HTTP request to an HTTP server (not shown), which returns a result set corresponding with the implicit query to the display processor.

Other methods for extracting keywords from data streams may be utilized by in alternative embodiment of the present invention. For example, the query system 132 may use identified terms to generate search queries. An identified term is a term that has been noted as being particularly relevant to the user's contextual state. For instance, an identified term may comprise the name of a person to which the user recently directed an email. The names need not be recent or popular; for example, the names may include all email addresses, etc. captured for a user. Even old, rare names may be useful to identify. For example, if a user has only sent or received a single message to a particular person several years ago, it may still be desirable to recall the message when the sender/recipient email address is recognized. In one embodiment, the names are limited to recent and/or popular names to limit the amount of data required to store the names. To extract the name, the query system 132 examines the user's email system and determines the names of users to which the user recently or often sends email messages. In another embodiment, the query system also correlates this information with the subject and or text of email or other correspondence. For example, if a user frequently sends email to a person, and the user also frequently refers to the name of an organization with which the person is affiliated (e.g., the company field of the person's contact information), the query system identifies the organization and content of interest to the person.

The query system 132 may also extract keywords from a selection or from a clipboard buffer. A selection comprises the text or objects that are highlighted in the currently active application. A clipboard typically stores information that was previously selected and copied or cut by the user.

Once the query system 132 has extracted keywords from a data stream, the query system 132 generates a search query 206. The search query that the query system generates may comprise keywords extracted from a single data stream or may comprise keywords extracted from multiple strings. Whether a word extracted from more than one source continues to be used in an implicit query may be determined in various ways. For example, if the word "budget" occurs with some frequency (e.g., fifty times) in a document but the user has not recently typed the word budget, budget may continue to be included in a query generated by the query system 132.

In the embodiment shown in FIG. 2, the query system 132 next transmits the search query to a search engine, for example, search engine (122) 208. In other embodiments, the query system 132 transmits the query to other search engines, for example, a search engine running on a server device 150, such as the Google™ search engine. The search engine 122 performs a search of one or more indices, either local or global, and provides at least one article identifier as a result set. The query system receives the result set from the search engine 210. Once the query system 132 receives the result set, the query system 132 may perform additional functions or additional operations on the result set. For example, in one embodiment of the present invention, the query system 132 ranks the article identifiers in the result set based on relevancy scores. The relevancy scores may be related to previous events that were recorded by the query system 132 or another component or may be based on other criteria.

Once the query system 132 has received the result set and ranked the results or performed other operations, a query system 132 transmits the result set to the display processor (128) 212. The display processor 128 displays the result set to the user. The display processor 128 may display the result set in a format similar to a format used for global result sets such as those provided by a search engine utilizing a global index, e.g., the Google™ search engine. The display processor 128 may alternatively display the result sets in a small window superimposed over another application that the user is currently using. In one embodiment of the present invention, the display processor 128 creates a window based on the amount of available screen space on the users display and displays the result sets from the query system 132 in the window that it created. In another embodiment, the window of an active application may be modified to include the result sets.

In one embodiment, once the desired number of results has been retrieved in a result set, the results are stored in memory, and the query system 132 informs the display processor 128. In another embodiment, if the number of results in a result set is less that a pre-determined minimum number, the query system 132 executes additional queries to retrieve results until the minimum threshold of results has been exceeded.

Figure 3:
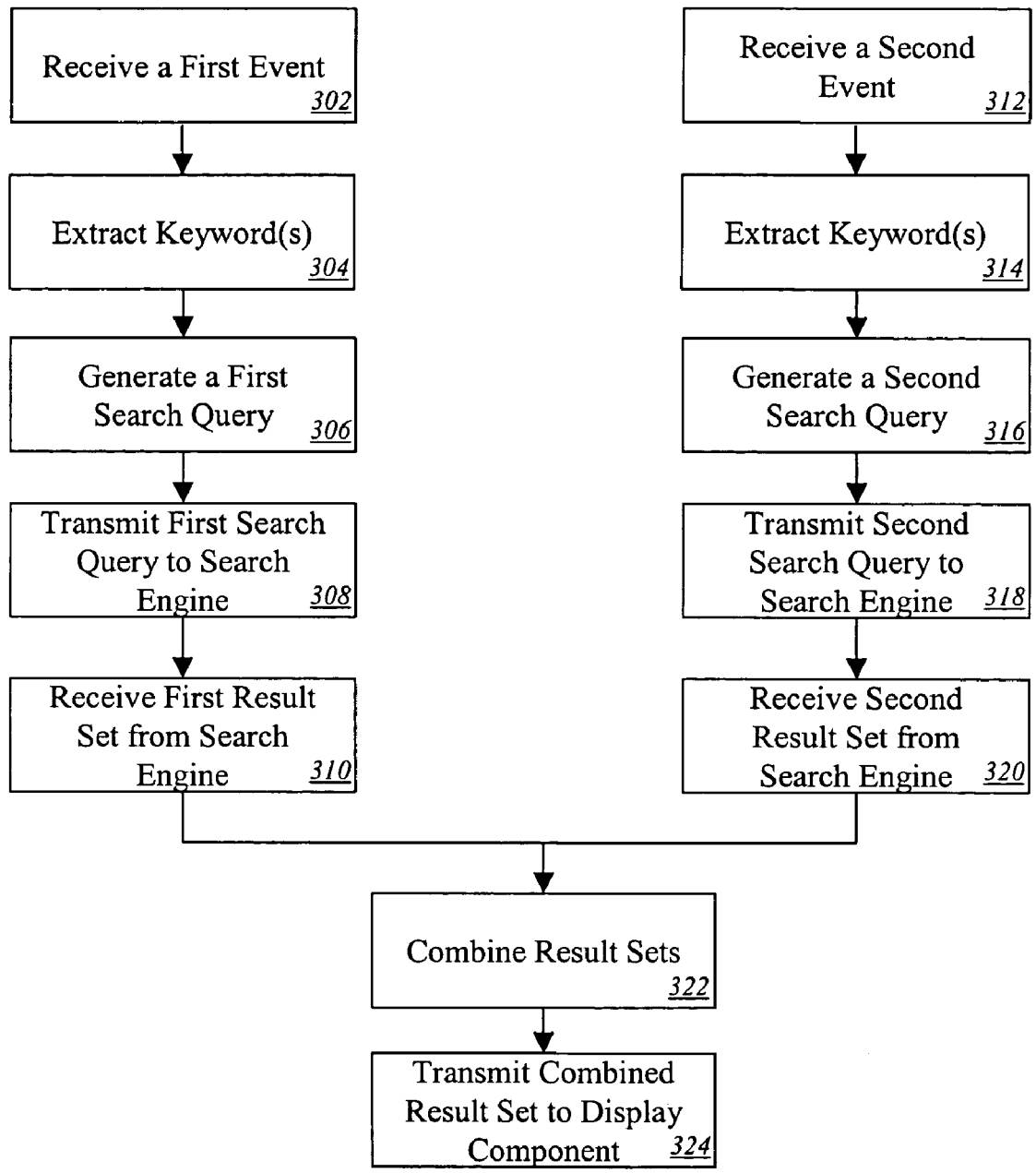
FIG. 3 is a flowchart illustrating a method of executing multiple queries to return results as relevant to the user's context in one embodiment of the present invention.

The query system 132 may execute a single query or may execute multiple queries based on one or more data streams in order to return result sets that are relevant to the current user context. FIG. 3 is a flowchart illustrating a method of executing multiple queries to return results relevant to the user's context in one embodiment of the present invention. In the embodiment shown, the query system 132 receives the first event 302. The query system 132 extracts keywords from the event 304. The query system 132 generates a first search query based on the keywords extracted from the first event 306. The query system transmits the first query to a search engine 308. The search engine to which the query system 132 transmits the search query may be a local or global search engine application. For example, the search engine application may comprise an application executing on the user's machine with access to content located on the machine or available to the machine on a local network or the search engine application may comprise a global search engine application, such as the Google™ search engine. The query system 132 then receives the first result set 310.

The query system 132 also receives a second event 312. The second event may comprise information from a second data stream. For example, in one embodiment of the present invention the present system receives the first event from a document buffer such as a Microsoft® Word document buffer. The query system 132 receives a second data stream from the clipboard. The query system 132 extracts keywords from the second event 314. The query system then generates a second search query based on the keywords extracted from the second event 316.

The query system then transmits the second search query to a search engine. As with the first search query, the query system 132 may transmit the second search query to either a global or local index. For example, in one embodiment of the present invention, the first event comprises information related to data that is stored on the user's local machine. Accordingly, the query system 132 transmits this search query to the local search engine (122) 318. The second data stream comprises information from the user's previously executed explicit query. In this case, the query system 132 transmits the search query to a global search engine 170, such as the Google™ search engine. The query system 132 next receives the second result set from the second search engine 320. As with the first result set, the second result set comprises at least one article identifier or may comprise plurality of article identifiers, which are relevant to the second search query.

Once the query system 132 receives the first result set and the second result set, the query system 132 combines the two result sets 322. The query system may combine the result sets in a number of ways. For example, in one embodiment of the present invention, the query system merges the two result sets, the results being ranked by the relevancy score regardless of from which query a particular result originated. In another embodiment of the present invention, the query system 132 takes into account the search query that was executed in determining how to combine the result sets. For example, the query system 132 may rate results acquired from a local index higher than those results acquired from a global index or vice versa. In such an embodiment, the result sets that are shown to the user will have the local results listed above the global results. Embodiments of the present invention may perform additional combining and/or ranking steps here as well. For example in one embodiment of the present invention the query system 132 evaluates the list of article identifiers that are returned from both result sets and eliminates any duplicates. In yet another embodiment, the query system 132 combines the article identifiers from each of the two result sets and then performs additional ranking, weighting, and sorting procedures on each of the result sets. For example, an article identifier that appears in multiple result sets may receive a higher weighting than if it had appeared in only one result set. In one embodiment, the result sets are not merged; they are displayed on one page in separate lists. Once the query system 132 has combined the result sets from the two search queries, the query system 132 transmits the combined result sets to the display processor (128) 224.

In one embodiment of the present invention, the query system 132 combines keywords from the last several implicit queries that were executed with keywords that originate from data streams from the user's current application. For example, in one embodiment of the present invention, the query system 132 extracts keywords from each of the last three queries executed by the user. The query system 132 combines the keywords that were extracted from the last three queries with keywords from the buffer of the currently active application. The query system 132 then executes a query for each set of keywords that are extracted, returning multiple result sets. The query system 132 then merges the result sets in a manner similar to those described herein. The query system 132 transmits the top n (e.g., top 20) results to the display processor 128 to be shown to the display to the user.

Figure 4:
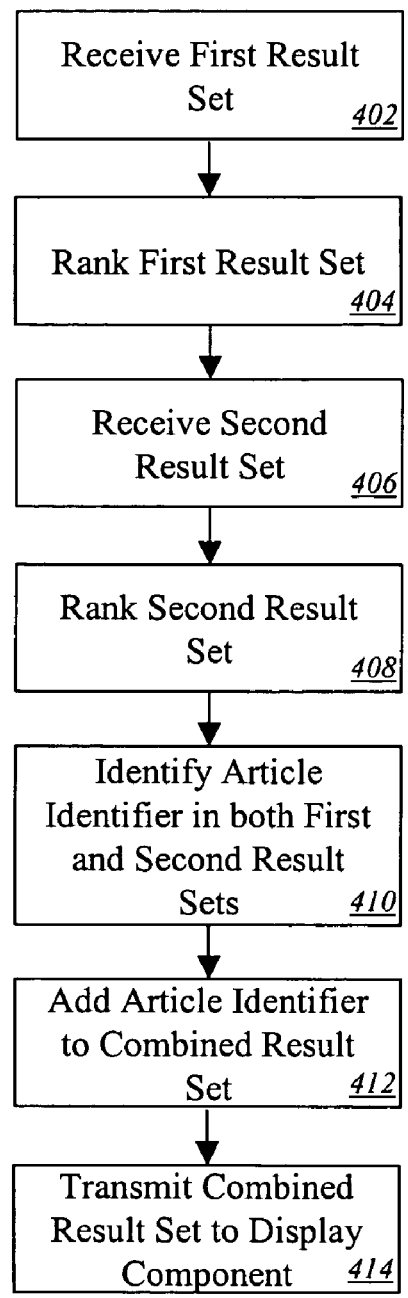
FIG. 4 is a flowchart illustrating a method for ranking combined results in one embodiment of the present invention.

FIG. 4 is a flowchart illustrating a method for ranking a combined results set in one embodiment of the present invention. In the embodiment shown, the query system 132 receives a first result set at 202. For example, the query system extracts a keyword from the buffer of the application the user is currently using and submits the search query to a search engine such as local search engine 122, and in response, the search engine executes a query and returns a result set to the query system 132. The query system 132 then ranks the first result set based on relevancy scores related to the user's current context state 204. The query system 132 receives a second result set 206. For example, the query system may submit a query to a global search engine 170, such as Google™ Search Engine. The query system 132 receives the second result set 206. The query system next ranks the second result set 208. In one embodiment of the present invention, the local and global result sets are ranked based on the same set of criteria. In other embodiments, the result sets originating from local and global indexes may be ranked differently based on user specified or other criteria. Those criteria may include click-through data from the user.

The query system 132 attempts to create a combined result set. The query system 132 may perform this in a number of ways. For example, in the embodiment shown in FIG. 4, the query system identifies an article identifier that appears in both the first and second result sets 210. An article identifier that appears in both the first and second result sets may be more likely to be of interest to the user than an article identifier that appears in only one of the result sets. The query system 132 creates a combined result set and adds the article identifier that was identified as being in both the first and second result sets to the combined result set 212. The query system 132 may repeat the steps 210, 212 to add additional article identifiers to the combined result sets. The query system 132 may perform additional types of methods in order to add article identifiers to the combined result set. For example, the query system 132 may extract the top ten article identifiers from each of the first result set and the second result set and add those article identifiers to the combined result set. The query system may further eliminate duplicates from the combined result set or perform other operations that are useful in creating a relevant combined result set for the user. Once the query system 132 has created a combined result set with the relevant article identifiers, the query system 132 transmits the combined result set to display processor 214. The display processor will then display the combined result set to the user.

In one embodiment of the present invention, the query system 132 regularly (e.g., continually) retrieves real time events and contextual events from the event queue. The real time events may comprise, for example, an event indicating that the user has loaded a particular file from the file system. A contextual event may comprise, for example, the fact that a user has typed a particular word into the document. The query system 132 uses the events to update the user's state, e.g., the list of most recently typed words, the current sentence, the current selection, the text that the mouse is currently over, the current text in the clipboard, or the entire buffer of an active application. The query system may maintain user state separately for each active application. For example, in one embodiment, the most recent words typed into each application are maintained separately. The query system 132 combines context for multiple applications (e.g., a word processing and a spreadsheet application). The query system 132 determines when and whether to recompute queries and issue new queries when the context changes. For example, in one embodiment of the present invention, the query system 132 attempts to recompute queries within 250 milliseconds of when the user pauses after a word. The query system 132 may recompute the queries immediately upon certain events, e.g., when the user loads the file or loads a web page. Query system 132 then constructs a query using the user's context such as the most recently typed words. The query system 132 may also construct a query string using special names such as the "To:" recipient of an email message that the user is writing, or the "buddy" name of another user with whom the current user is having an instant messenger conversation. The query system 132 sends the query string to the query processor.

Figure 5:
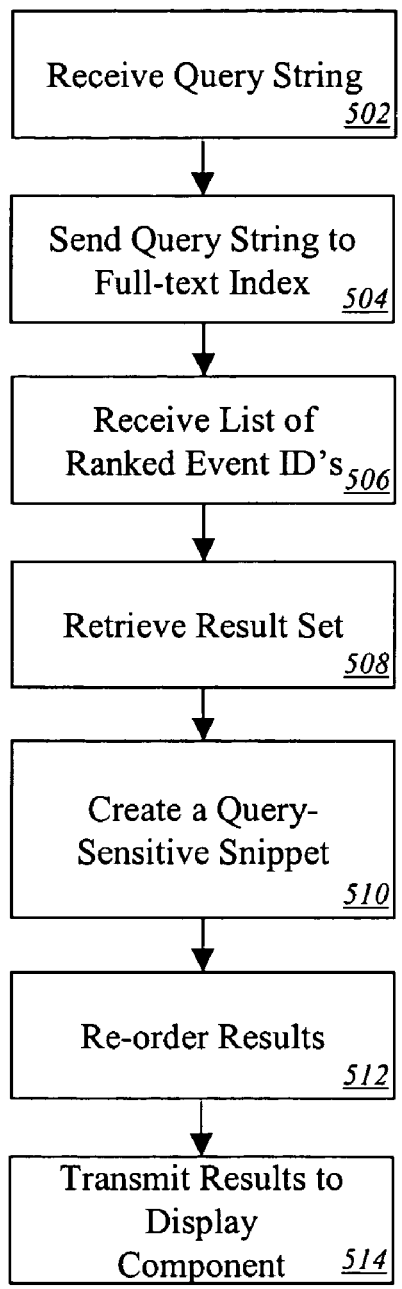
FIG. 5 is a flowchart illustrating the method for processing a query in one embodiment of the present invention.

FIG. 5 is a flowchart illustrating the method for processing a query in one embodiment of the present invention. In the embodiment shown, the query system 132 first receives the query string 502. The query system 132 may receive the query string in a number of ways. For example, in one embodiment, the query system 132 receives an API call with a query string created via one of the two methods described herein. The query system 132 then sends the raw string to the full text index. In response, the query system 132 receives a list of ranked event IDs 506.

Using the list of ranked event IDs, the query system 132 retrieves the result set at 208. For example, in one embodiment of the present invention, the query system 132 iterates over the list of events until enough results are retrieved to provide a query that will result in a result set sufficient for display to a user. During the process of iteration, the query system 132 retrieves the event record from the data store 140, which includes information such as the type of event and location (e.g., the URL, path, or other location attribute).

An embodiment of the present invention may filter results received from the local or global index. The results may be filtered based on a variety of parameters. For example, in one embodiment, if the result set that the query system 132 finds does not meet the query restrictions, the query system moves to the next result. This step is referred to as the query syntax filter. If the result found does not match a display restriction (e.g., email only), the query system skips to the next result. This step is referred to as the display parameters filter.

In another embodiment, the results are filtered based on parameters of an article in a result set. The query system 132 in such an embodiment receives the URL, site, user, cache date, and file type of each of the returned results. The results may be filtered by the query system 132 or may alternatively be filtered by the event database. Which component filters the results depends on the full text index used by the embodiment of the invention and also depends on other criteria such as the storage space required and the effect on the query time. The display parameters that may be filtered include file type and number of results.

The query system 132 filters the results after receiving n results from the full-text index. The query system ranks results and compares the results against the filters. If the result does not pass the filters, the result is eliminated from the results that will be returned to the user.

In one embodiment of the present invention, the query system 132 generates snippets to be displayed with or in place of a link and title. In one such embodiment, when the query system 132 indexes a web page document, e.g., when the user loads the document, the query system 132 retrieves document context, including, for example, the first one hundred kilobytes of document text. The query system 132 scans the document context for script tags. It removes the script begin tag, the script end tag, and all text in between the two tags. It then does the same for the style tags, removing the style begin tag, the style end tag, and all text between those two tags. Next, the query system 132 removes other tags that are within less than and greater than (<>) symbols. As the query system 132 iterates over the words in the text, the query system 132 builds a list of positions where the search terms are located within the document. The query system stores the information in the data store.

Once the query system 132 has retrieved the results and created a snippet for each of the results in the result set, the query system 132 reorders results based on information from the document records, such as the frequency of access. In other embodiments, other methods are used to reorder the result set. In one embodiment of the present invention, the query system 132 may also store a filter list—details regarding which filters were applied and/or what the results of filtering were—in memory. By storing the filter list in memory, the query system 132 is able to subsequently access the list to determine relevant results for the user's context state and for other purposes, e.g., in one embodiment the query system 132 accesses the filter list or the memory in order to determine a relevancy score for results appearing in newly retrieved result sets.

The query system 132 next transmits the results to the display processor 514. The display processor 128 then processes the results into a format that can be displayed to the user. For example, in one embodiment of the present invention, the display processor 128 processes and transmits the result set as an HTML document. IN another embodiment, the display processor 128 processes and transmits the result set as an XML document.

In one embodiment of the present invention, the query system 132 forms multiple query strings and combines results of the queries to determine what inputs are most likely to provide relevant results. For example, in one embodiment of the present invention, the query system 132 utilizes a sentence extracted from a Microsoft® Word document. For example, consider the following sentence: "What is the budget for the second quarter of 2003?" Not all the words that appear in this sentence are necessary for a search query. For example, many of the words in the sentence are filler or "stop" words. Filler words include words such as "the" which are determiners and are not necessarily relevant to any particular query. These words may be filtered out before the search query is submitted to the search engine 122. The original sentence may be maintained to compare to future content extracts.

An embodiment of the present inventions is able to use various measures to determine which results to show to the user. For example, in one embodiment of the present invention the click-through rate for a particular article may be used to determine whether or not a keyword should be thought of as relevant, e.g., if the user clicks on a particular result in a content display window, the keyword used to locate the result may be more relevant than other keywords. An embodiment of the present invention is able to extract keywords from multiple strings, thus providing a more complete view of the user's context. For example, in one embodiment, keywords are extracted from an email message and a word-processing document. The message and document may be closely related, somewhat related, or unrelated; by utilizing both sources for keywords, the embodiment is able to either rate a shared keyword more highly or provide additional keywords. An embodiment of the present invention is able to use user activity to trigger the execution of a query for context relevant data. For example, in one embodiment, when a user completes a sentence in a document by typing a punctuation mark, query execution is triggered.

Embodiments of the present invention may present the user with clearer results in a format similar to the result sets that are provided by generally available search engines such as the Google™ Search Engine. The results include links that the user can click on to see the current copy of the document in its original form (e.g., PDF) or a cached copy, which is stored in a processed format (e.g., HTML). For example, the user may wish to see an HTML version or the original version may not be available in a repository any longer. The results also include a snippet to indicate to the user why the results are included in the result set. The result set also includes information for a particular article such as the size, the time the article was last accessed, and the frequency of access of the article. The results may contain a picture which is either a representative image selected from the document content if one exists; a screen shot of the document or another image that helps the user to understand why the article is included in the results. The query system returns objects that are on a results page. The display processor 128 completes the formatting of the page. The exact formula rule set may vary based on implementation of a particular embodiment of the present invention.

The query system 132 creates query strings based on a user's current context. By creating queries based on the user's current context, the query system 132 saves the user time by producing results without requiring the user to type in the explicit query. The user may be interested in these results but may not have typed in the query explicitly for a number of reasons. For example, a user may not remember that he wrote an email related to the current context. However, once the email is presented to the user and the content is displayed, the user may exhibit an interest in the article. Another example is that the user may recall having performed a similar task before, but may not recall enough information to actually perform an explicit search. Therefore, the query system 132 provides information to the user that the user may otherwise not be able to, or might not, access.

A query system filters results and generates snippets and then stores the query results in memory. For explicit results, the user makes a request via a web browser, and the results are returned via an HTTP server, which transmits the results to the web browser as an HTTP response. In contrast, for implicit query system 132 queries, the query system notifies the display processor that new results are ready and the display processor makes an HTTP request to the HTTP server to retrieve the results.

In one embodiment, once a query system has results from each of these queries, the query system merges them into a single list giving weight to the relevance score based on which list they come from. For example, in one embodiment, query results are based on the recently typed words, which are weighed more heavily than results based on words from the entire document. For example, one embodiment uses factors such as how frequently the words appeared in a document, the document frequency of the words, and how long the foreground application has been in the foreground in order to determine the relevancy of the generated query string.

The query system 132 may combine the relevance score of the results to the query string with the relevance of the query string itself. The query system 132 then filters out results below a relevance threshold score. Based on user's click-through data, the filter may also be adjusted. In such an embodiment, the query system 132 attempts to strike a balance between showing a user too few results, resulting in a blank content display window that is not useful to the user, and showing too many results, resulting in a high noise-to-signal ratio that is similarly not useful.

An embodiment of the present invention may use various parameters to determine when to show a user a new result set. In one embodiment, various queries are constructed and executed at different rates. For instance, in one embodiment, the query system 132 updates a query based on the most recently typed words after the user has typed n new words (e.g., 10 or 20). In contrast, the query system 132 in such an embodiment constructs and executes a new query based on a complete document buffer when either the document is opened or the window in which the document is displayed is brought into focus. Various other types of measures may also be used, including, for example, the entry of a punctuation mark.

In one embodiment of the present invention, the query system 132 utilizes a relevance metric to filter out results that are below a threshold of relevance. A user may be willing to accept a higher level of noise in relation to an implicit query than they would tolerate with regards to an explicit query, i.e., the user is provided with results without having to perform the step of issuing an explicit query and, therefore, may be more willing to accept results that are not as relevant to the context of the user as the explicit results are relevant to the explicit query. On the other hand, the user is sacrificing screen real estate in order to display the contents display comprising the implicit query results. Accordingly, in one embodiment, an assumption is made that the implicit results should be relevant, at least to some degree, to the user's current context state. Thus, different and even contradictory assumptions may be made about relevancy of implicit versus explicit results in various embodiments of the invention.

Figure 6:
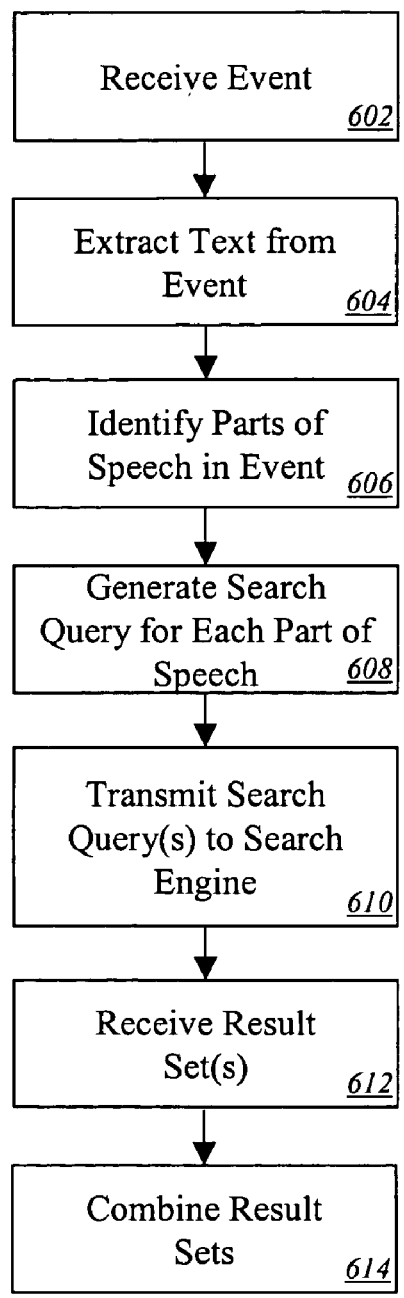
FIG. 6 is a flowchart illustrating a method for identifying parts of speech in one embodiment of the present invention.

FIG. 6 is a flowchart illustrating a method for identifying terms in one embodiment of the present invention. In the embodiment shown in FIG. 6, the query system 132 receives an event 602. The event may comprise, for example, an event signifying that a user has typed a sentence in a document. The query system 132 extracts text from the event 604. The query system 132 then identifies parts of speech in the text of the event 606. Parts of speech include, for example, nouns and verbs. The query system 132 may also identify names within the content by comparing the parts of speech to previously stored names or by using processing rules. Automatic part of speech tagging is known. See, e.g., Brill, Eric; *A Simple Rule-Based Part Of Speech Tagger*; Proceedings of ANLP-92, 3rd Conference on Applied Natural Language Processing (1992). Various statistical and rule-based techniques may be utilized. For example, in one embodiment, a word is initially categorized as a verb based on a stored corpus. The categorization may then be modified based on the context in which the word appears, on a property of the word, or based on other observed properties. For example, proper nouns are generally capitalized; if a word that generally functions as a verb is capitalized in the middle of sentence, it may be functioning as a noun in that sentence.

The query system 132 next generates a search query for one or more parts of speech 608. For example, the query system 132 may generate one search query for nouns and another for proper nouns. The query system 132 transmits the search query to at least one search engine, which may be either local or global 610. The query system 132 then receives search results resulting from the search queries 612. In the embodiment shown, when the query system 132 receives results from all of the submitted queries, the query system 132 combines the result sets 614. The result sets may be combined in various ways as described herein. In one embodiment, the query system 132 weights results associated with different parts of speech in different ways, e.g., noun-related results may be weighted more heavily than verb-related results.

Figure 7:
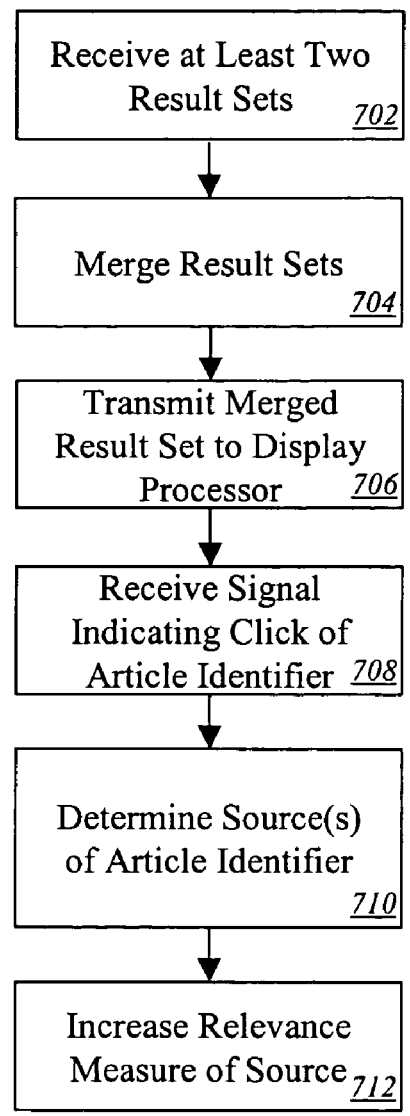
FIG. 7 is a flowchart illustrating a method for altering a relevance score in one embodiment of the present invention.

FIG. 7 is a flowchart illustrating a method for altering a relevance score in one embodiment of the present invention. In the embodiment shown, the query system 132 receives at least two result sets 702. The two result sets are received in response to the issuance of two queries, for example, the noun-related and verb-related queries discussed in relation to FIG. 6 above. The query system 132 merges the result sets to create a merged result set 704. For example, the result sets may include article identifiers that are common to the result sets. If so, the query system 132 eliminates the duplicates when creating the merged result set. The query system 132 transmits the merged result set to the display processor 128.

The display processor 128 presents the user with the merged result set. The display processor 128 may present the merged result set in a format similar to that used by conventional web search engines, such as the Google™ Search Engine. Other formats may be used. For example, in one embodiment, each article identifier in the merged result set includes a hyperlink. The user is able to click on the hyperlink to indicate interest in the hyperlink. In the embodiment shown, the user clicks on a hyperlink and causes a signal to be transmitted to the query system 132.

The query system 132 receives the signal indicating an interest in the hyperlink 708. In response, the query system 132 searches the data store 140 to determine the source of the article identifier in the merged result set 710. The query system 132 increases the relevance score of the source of the query 712.

For example, the query system 132 receives three result sets and merges the result sets to create a merged result set. The query system 132 stores the source of each of the article identifiers, in memory or in the data store 140, for example. The query system 132 then receives the signal indicating interest in a particular article identifier and searches the data store 140 to determine what the source or sources of the article identifier was, i.e., from which query or queries did the article identifier originate. The query system 132 identifies the first two queries as having resulted in the article identifier that the user clicked. The query system 132 increases a relevance score for the query sources when subsequent queries are executed. Accordingly, in the results from subsequent queries, the results from the sources that the user has previously shown interest in will appear higher in the list that is shown to the user. This may facilitate presenting the user with relevant results. A query source can be (a) an application (e.g., a word processor), (b) a type of query (e.g., text nearby the cursor position, recently typed words, or recognized items, such as email addresses), (c) a type of event, such as receiving an email or opening a document, (d) a keyword, (e) an article type filter or restriction (e.g., .doc files), or (f) combinations thereof. As an example, based on click-through data, the system may determine that a query for a name is particularly successful for a particular user when the user receives an instant message referring to the name.

In one embodiment of the present invention, a content display is displayed on a user interface. The content display comprises one or more article identifiers that are associated with a search query. For example, the query system 132 may derive and submit an implicit search query based on the user's contextual state. The query system 132 displays the results associated with the implicit query in a content display. In one embodiment, the query system 132 periodically (e.g., every two seconds) generates another implicit query based on the user's then current contextual state. The query system 132 then determines whether or not to update the content display to provide the new results. The query system 132 may determine that the currently displayed results need not be replaced. For example, in one embodiment, the query system 132 compares the previous query to the current query. If the queries include many or all of the same terms, the query system 132 does not update the content display with the new results.

For example, in one embodiment, a user may be editing a word processing document when a first implicit query is generated. The implicit query may be based on various attributes of the document and other parameters as described herein, such as for example, text recently typed by the user. The query system 132 displays the results of the implicit query in a content display appearing on the right side of the user's display. If user continues to edit the document and makes minor changes to the document. Some time (e.g., five seconds) after the first implicit query is executed, the query system 132 generates a second query based on the user's contextual state. At this point, the query system 132 may compare the two queries to determine whether or not to execute the second query or may cause the second query to be executed. When the results set is returned, the query system 132 compares the result set from associated with the latest query to the result set currently displayed in the content display. Since in this example the user is editing one document in a single application, the user's contextual state may not have changed significantly. Thus, the result set may not have changed significantly and it may be more distracting than useful to display the new results.

Using the same example, assume that the user next activates an email application and reads a first email message. The query system 132 generates a third implicit query. The system may now consider to the user's contextual state to have changed significantly, since the user is interacting with a different application altogether. As such, the third result set associated with the third query may vary substantially from the currently displayed result set (i.e., the result set from the first query in this example). If some aspect of the result set does vary sufficiently, e.g., the number of articles in the third result that are not in the currently displayed result set is greater than a predetermined threshold, the query system 132 refreshes the content display, displaying the third result set in place of the first result set.

In embodiments of the present invention, the query system 132 may determine whether or not to update the content display in various ways. For example, the query system 132 may compare a current search query to a previously executed search query. In one embodiment, the query system 132 a result set associated with a recently executed query to a result set associated with a query executed prior to the recently executed query. If the result sets are substantially different, the new more recent results replace the prior results, in whole or in part. The difference between the results may be determined using various factors. For example, the set of article identifiers may be compared. If the article identifiers are all or substantially the same, the query system 132 may not update the content display.

Figure 8:
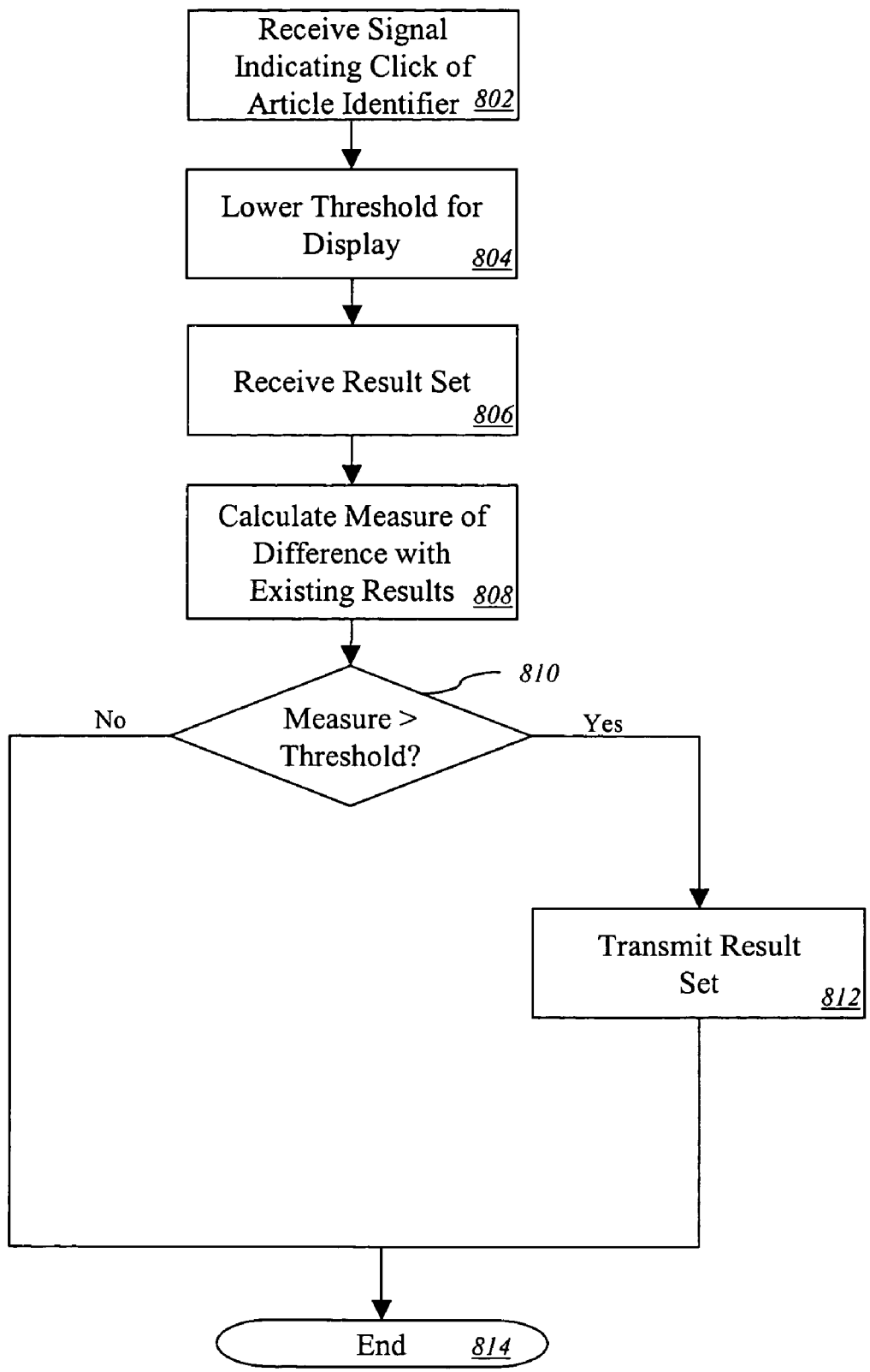
FIG. 8 is a flowchart illustrating a method of varying a refresh threshold in one embodiment of the present invention.

In one embodiment, the query system 128 compares the difference in result sets to a threshold to determine whether or not to refresh a content display. FIG. 8 is a flowchart illustrating a method of varying a refresh threshold for a content display in one embodiment of the present invention. In the embodiment shown, the query system 132 makes a determination of whether or not to display new results in a content display based on a refresh threshold. If the difference between the number, type, ranking, or other property of the article identifiers in the new result set and the same property for article identifiers in the new result set is lower than the threshold, the result set is not displayed. One reason for not showing the new result set is to maintain consistency in the user interface to avoid distracting the user. The threshold may vary based on user activity. For example, in the embodiment shown, the query system 132 receives a signal indicating an interest in an article identifier by the user 802. In response, the query system 132 lowers the threshold for display of the new result set 804. In other words, the new result set may be more similar to the currently displayed list than before the threshold change and still be shown to the user since the user is indicating an interest in the information provided in the content display window. The query system may time the updating of the result set in relation to other events, for example, updating the result set around the same time as a user browses a new web page, as opposed to updating the result set at a random time, which may be more distracting to the user.

The query system 132 receives the new result set 806. The query system 132 then calculates a measure of difference from the existing result set, i.e., the currently displayed result set 808. The measure of difference may comprise a relatively simple calculation, e.g., the number of article identifiers that are in both the existing result set and the new result set. The measure may instead comprise a more complicated measure. For example, the query system 132 may calculate a relevance rating for both result sets and then compare the difference in relevancy ratings to a relevancy threshold. If the measure is greater than the threshold 810, the query system 132 transmits the new result set to the display processor 128 for display 812, and the process ends 814. If the measure is less than or equal to the threshold, the query processor does not transmit the result set to the display processor, and the process ends 814.

Figure 9:
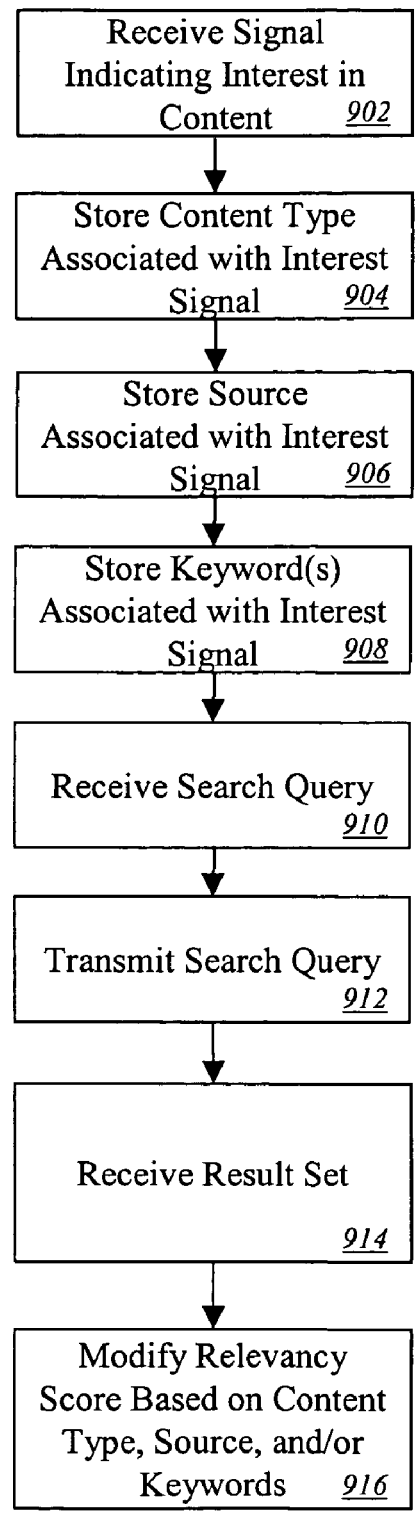
FIG. 9 is a flowchart illustrating a method of varying a relevance score for a result based on a user's click-through behavior in one embodiment of the present invention.

FIG. 9 is a flowchart illustrating a method of varying a relevance score for a result based on a user's click-through behavior in one embodiment of the present invention. In the embodiment shown, the query system 132 receives a signal indicating an interest in content displayed in the content display window 902. The query system 132 evaluates the interest signal to determine the content type associated with the content and stores the content type in a data store 904. The content type may define, for example, the file type of the content. The file type may be a web page, .PDF file, image, email, word processing document, spreadsheet document, text file, or any other suitable content type. The query system then determines and stores information indicating the source of the content associated with the interest signal 906. The source may comprise, for example, the web, a local machine, or other source of data. In one embodiment, the source comprises the search query used to retrieve the results. In the embodiment shown, the query system 132 also stores the keyword or keywords associated with the interest signal 908. In another embodiment, additional attributes of the content, which are associated with the interest signal, are also stored. The process of receiving an interest signal and storing attributes associated with the interest signal may be repeated multiple times, such as each time the user clicks on a link in the content display window or other events occur as described herein.

The query system 132 subsequently receives a search query 910. The query system 132 transmits the search query to a search engine. 912. The search engine returns a result set in response to the search query, which the query system 132 receives 914. The result set comprises one or more article identifiers. The article identifiers are associated with a relevance score. The query system 132 uses the click-through data stored in the data store 140 to modify the relevancy score of each of the articles identifiers in the result set based on the type of content, the source of the content, and the keywords used in the search query.

In another embodiment, the query system 132 receives multiple queries after storing the content type, source, keyword(s), and other information. When the query system 132 receives the multiple corresponding result sets, the query system 132 uses the previously stored click-through data to adjust the relevancy scores both within and across result sets before displaying the combined result set to the user.

One embodiment of the present invention utilizes content type, source, keyword, and other data related to items that the user did not click on. The query system 132 of one such embodiment reduces the relevancy score of article identifiers corresponding to content types and sources that the user has not clicked as frequently as other types of content.

For example, in one embodiment, the user views a web page and edits a document. Four queries are generated from the user context. The first query comprises information from the web page. The second query comprises the last ten words that the user types. The third query comprises the sentence that the user just pasted in the document. And the fourth query comprises the words that the user is currently selecting with the mouse. The query system 132 submits the queries to one or more search engines and receives four result sets in response. The query system 132 merges the results and presents the first ten results to the user in a content display window.

The user clicks on the second result in the content display window. The second result was present in the result set from the first query and the result set from the third query. In the first query, the result was ranked first; in the third query, the result was ranked fifth. In such an embodiment, the sources that lead to the result that the user selected are boosted to provide positive reinforcement proportional to how much each contributed to the result being shown. The content type, source, keywords, and other attributes associated with the result all may be boosted so that in future queries, those types of results are more likely to be shown to a user.

Figure 10:
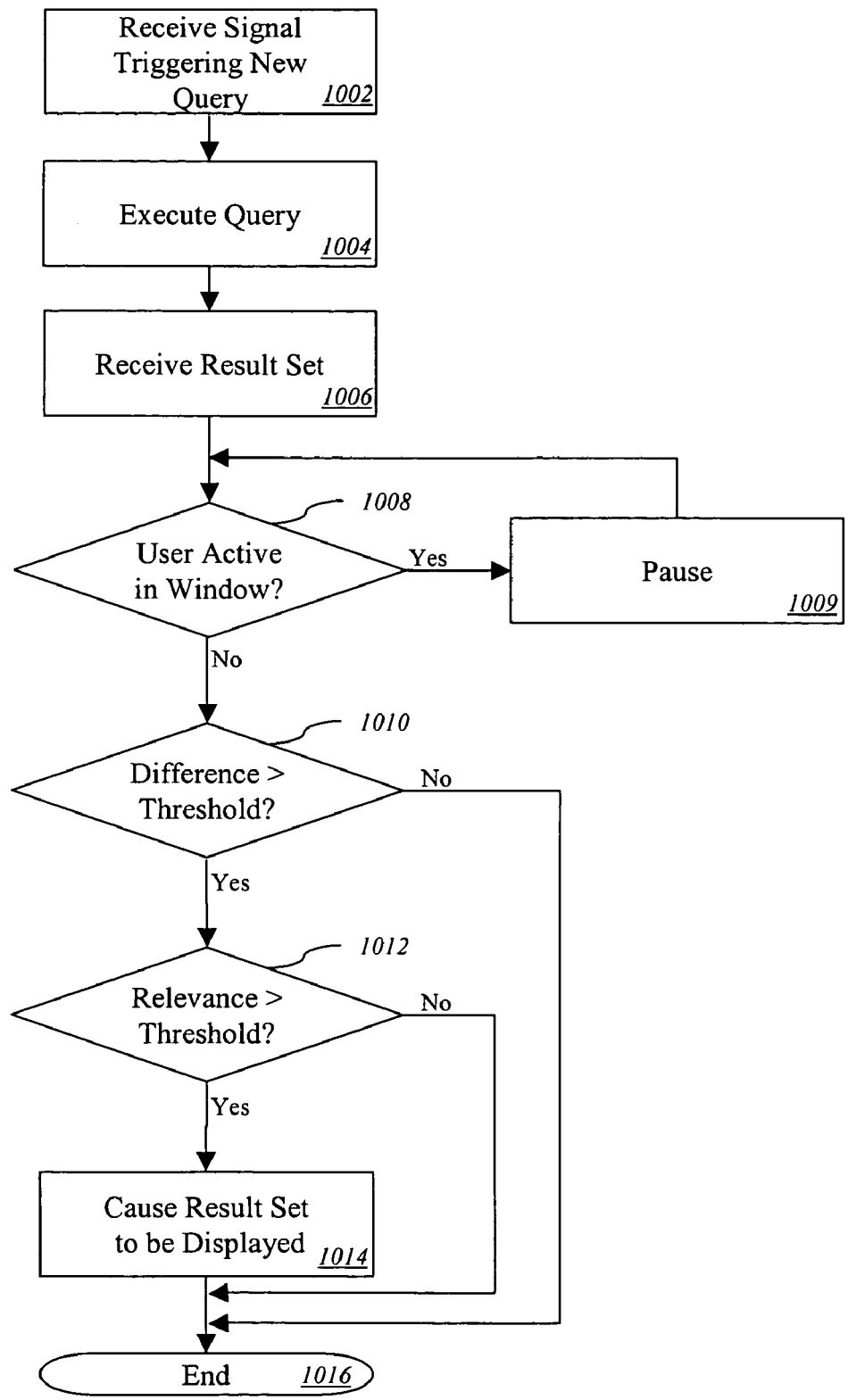
FIG. 10 is a flowchart illustrating a method for displaying implicit query results in one embodiment of the present invention.

FIG. 10 is a flowchart illustrating a method for displaying implicit query results in one embodiment of the present invention. In the embodiment shown, the query processor receives an event triggering execution of a new query 1002. For example, the user may have entered a punctuation mark at the end of a sentence, or the user may have received an instant message. In response, the query system 132 executes a new query 1004. The query system 132 subsequently receives the results of the query 1006.

The query system 132 (or display processor 128) next decides whether or not to display the new query results in the content display. The query system 132 may use any number of criteria to decide whether or not to show the new results. In the embodiment shown, the query system 132 determines whether or not the user 112a is active in the content display window 1008. The query system 132 may determine that the user 112a is active in the window by, for example, determining the current mouse position. The query system 132 (or display processor 128) can determine the current cursor position by querying the operating system and comparing the cursor position to the area covered by the content display window. The operating system may also be able to report the currently active window. If the content display window is active, the query processor 132 pauses for some period of time (e.g., two seconds) 1009, and then repeats the determination of whether or not the content display is the active window 1008. In another embodiment, the query system 132 also pauses if the cursor is moving towards the content display window, evidencing the user's possible intent to interact with content displayed there.

If the content display window is to be updated, the query processor 132 determines the difference between the results returned from the latest query and the results currently displayed in the content display and compares the difference to a threshold 1010. The query processor may determine the difference in numerous ways. For example, the query processor 132 may determine how many article identifiers appear in the new result set and are not present in the currently displayed result set. The query system 132 may also or instead determine how much overlap exists between the keywords in the query or queries that provided the currently displayed content versus the keywords in the query or queries that provided the new results. In another embodiment, the keywords comprise categories, and the query system 132 evaluates overlap between the categories. If the difference measure is less than a threshold measure, the process ends 1016. In other words, if the new result set and the currently displayed result set are very similar, then showing the new result set is not necessary and may even be unnecessarily distracting to the user 112a. Accordingly, if the difference between the new result set and the currently-displayed result set is not greater than a pre-determined threshold, the new result set is not shown to the user 112a.

In the embodiment shown, if the difference between the new result set and the currently-displayed result set is greater than a threshold measure, the query processor 132 determines whether the relevance of the new result set to some aspect of the user's data or actions is greater than that of the currently-displayed result set 1012. If not, the process ends 1016; the new results are not shown to the user 112a. If the relevance measure of the new result set is greater than that of the currently displayed result set, the query processor 132 causes the new result set to be displayed 1014. The process then ends 1016. The process shown in FIG. 10 may be repeated in order to ensure that the content display continues to show results relevant to what the user's contextual state. For example, the process shown may repeat every ten seconds or other suitable time interval.

Other methods of determining when to update the content display window may also be used. For example, in one embodiment of the present invention, the query system 132 causes less relevant results to be displayed if a certain time period has passed. In such an embodiment, it may be assumed that if the user has not clicked on the content in the content window display, then other content may prove more relevant even though the initial relevancy scores of the content are lower than what is currently displayed. In another embodiment, only a portion of the currently displayed results is replaced by content that seems to be less relevant.

In one embodiment of the present invention, the queries themselves are not run if the user is not active and if the user's system is not active. For example, in one such embodiment, the user stops typing or interacting with the user interface for a relatively long time period (e.g., five minutes). During those five minutes, no other activity, including for example the reception of email, occurs. Based on the relative lack of activity, the query system 132 pauses and does not execute queries based on the user's contextual state. When the user begins interacting with the interface again or when other actions occur, such as the reception of an email, the query system 132 begins submitting contextual queries and causing the output of corresponding results. In another embodiment, the query system 132 pauses even when email is received. If the user is idle for a certain period of time, he may be away from the machine, and it may be preferable not to execute implicit queries so as to not cause the user's programs to be swapped out of memory.

Figure 11:
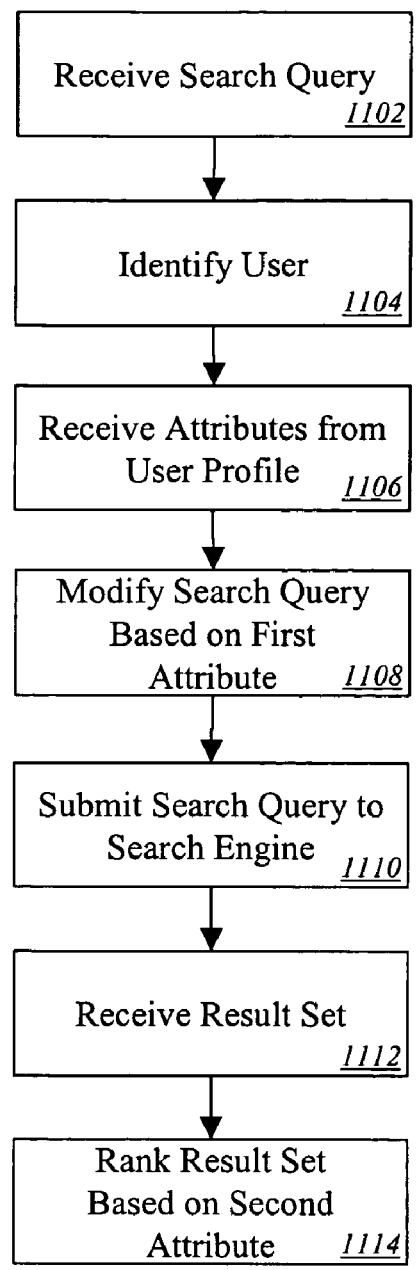
FIG. 11 is a flowchart illustrating a method according to one embodiment of the present invention for modifying a search query and the corresponding result set based on the search query, the modifications based at least in part of an attribute stored in a user profile.

In one embodiment of the present invention, a user profile provides attributes, which may be used by the query system 132 to modify search queries, and/or result sets to provide the user with a personalized experience. Attributes stored in the user profile that may affect search queries and/or the ranking of results sets include information such as people to whom or from whom a particular user sends or receives email or chat messages, words that appear often in the user's explicit searches, words the user often types, words that appear frequently in the user's documents, and other types of attributes specific to the user. FIG. 11 is a flowchart illustrating a method according to one embodiment of the present invention for modifying a search query and the corresponding result set based on the search query, the modifications based at least in part on an attribute stored in a user profile. In the embodiment shown, the user 112a enters a search query. The query system 132 receives the search query 1102. The query system 132 determines which user submitted the search query 1104. For example, a user identifier may be included with the search query. Alternatively, the query system 132 may determine the user by calling an operating system function call to determine the user currently logged into the computer.

The query system 132 utilizes the identity of the user to retrieve attributes from the user profile 1106. The user profile may be stored in the data store 140. Alternatively, the user profile may be stored on a server device, such as server device 150, in communication with the network 106 and thereby accessible to the query system 132.

The user profile may store a plurality of attributes that are user specific. For example, the user profile may store the preferred size and placement of a content display window for a particular user. The user profile may also store preferred terms and search methods for a user. The attributes in the user profile may be set explicitly by the user or may be set implicitly, without express entry thereof by the user, based on actions of the user, the time of day, or any other event or actions that may be tracked by the computer system.

In the embodiment shown, the query system 132 receives at least two attributes from the user profile; a first attribute that is search related, and a second attribute that is result set related. The query system 132 uses the first attribute to modify the search query 1108. The query system 132 then submits the search query to a search engine 1110. For example, the user may enter a term followed by a punctuation mark in a document, triggering an implicit search query. When the query system 132 receives the search query, the query system 132 modifies the search query and submits it to a search engine rather than submitting the search query directly to the search engine.

The query system 132 receives the search result set from the search engine 1112. The result set comprises one or more article identifiers. The article identifiers may be sorted in any of a number of ways. The query system 132 uses a second attribute from the user profile to rank the results 1014. For example, the user 112a may prefer results from a particular website over results provided from any other source. If the user 112a has such a preference, the query system sorts the result set based on that preference.

In one embodiment of the present invention, the query system 132 stores important terms, including for example, the names of people with whom the user often communicates, in memory. These names may come from recipients or senders or emails or instant messenger "buddy" names, for example. In such an embodiment, the user profile may not be provided. The query system uses the important terms stored in memory to affect the creation of search queries and/or the ranking of result sets.

One embodiment of the present invention generates implicit queries based on a portion of the text in a document or article in which the user is showing an interest. Showing an interest may comprise typing in the document, printing the document, sending the document (e.g., via fax or email) or any other action that may be used to indicate an interest. One such embodiment is able to differentiate between boilerplate present in the article and content; the content is what is used for generating the implicit query.

Figure 12:
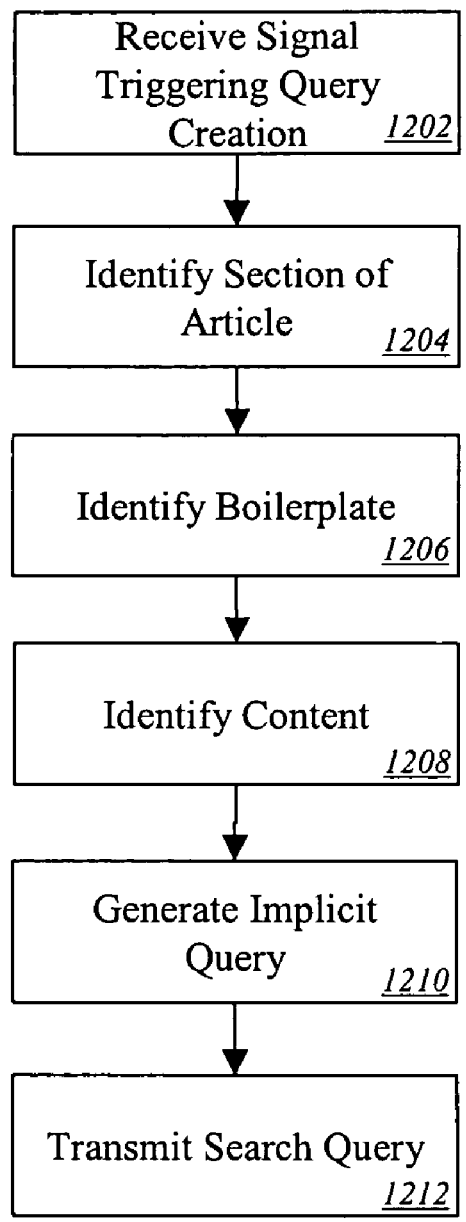
FIG. 12 is a flowchart illustrating a method for identifying boilerplate and content in one embodiment of the present invention.

FIG. 12 is a flowchart illustrating a method for identifying boilerplate and content in one embodiment of the present invention. In the embodiment shown, the query system 132 first receives a signal triggering implicit query creation 1202. This signal may be generated in response to typing by the user 112a. For example, the user 112a may type a sentence ending in a period. In response to receiving the signal, the query system 132 identifies a section of the article in which the user 112a is showing an interest 1204. The section may comprise the whole document or a portion of the document.

Within the section that the query system 132 identifies, the query system 132 evaluates the text or other elements to identify boilerplate 1206. For example, in one embodiment, the query system 132 determines that any text following the word "copyright" is boilerplate. Other types of boilerplate include, for example, navigational text, disclaimers, and text that appear on every page of a web site. The query system then identifies content within the article 1208. The article may comprise only content and boilerplate or may include additional elements, such as controls, which are not used in generating a query. In one embodiment, the attributes of button in the article are used to generate an implicit query.

Once the query system 132 has identified content in the article, the query system 132 generates an implicit search query 1210. The query system 132 then submits the search query to a search engine 1212.

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A computer-implemented method for generating multiple implicit search queries comprising:
    identifying a plurality of events responsive to monitoring real-time user interactions with a client device;
    identifying a plurality of user-context attributes based at least in part on the plurality of events, wherein the plurality of user-context attributes indicate aspects of the real-time user interactions with the client device;
    generating a plurality of implicit search queries comprising terms, wherein the terms are based at least in part on the plurality of user-context attributes;
    receiving a plurality of search results generated responsive to the plurality of implicit search queries; and
    updating a display of search results responsive to receiving the plurality of search results.

2. The method of claim 1, wherein the real-time user interactions with a client device comprise changes in a position of a cursor on the client device.

3. The method of claim 1, wherein the real-time user interactions with a client device comprise user interactions with applications on the client device.

4. The method of claim 1, wherein monitoring user interactions with the client device further comprises monitoring multiple types of real-time user interactions with the client device.

5. The method of claim 1, wherein at least a first event of the plurality of events comprises one or more words and identifying the plurality of user-context attributes further comprises extracting a term from the one or more words.

6. The method of claim 5, wherein extracting the term from the one or more words comprises identifying content unique to the first event based on the one or more words and extracting the term from the one or more words based on the unique content.

7. The method of claim 5, wherein extracting the term from the one or more words comprises identifying a part of speech associated with the term based on analysis of the one or more words.

8. The method of claim 5, wherein identifying the plurality of user-context attributes further comprises generating a term measure based on at least a first frequency that the extracted term occurs in at least one of the one or more words and an index of content.

9. The method of claim 8, wherein generating the plurality of implicit search queries comprising terms further comprises generating a plurality of implicit search queries comprising terms selected responsive at least in part to the term measure.

10. The method of claim 1, wherein generating the plurality of implicit search queries comprising terms further comprises:
    identifying for a user, a user profile comprised of a plurality of user attributes;
    identifying a search term based at least in part on the plurality of user attributes; and generating an implicit search query based at least in part on the search term.

11. The method of claim 1, further comprising storing the user-context attributes, and wherein identifying the plurality of user-context attributes further comprises identifying a stored previous user-context attribute.

12. The method of claim 1, wherein receiving the plurality of search results generated responsive to the plurality of implicit search queries further comprises receiving the plurality of search results responsive to a plurality of searches, each search of the plurality of searches directed to at least one of a local index of content stored on the client device and a global index of content on a network.

13. The method of claim 1, wherein the search results comprise a first search result set and updating a display of search results responsive to receiving the plurality of search results further comprises combining the first result set with a second result set, the second result set comprised of results from previously generated search queries.

14. The method of claim 1, further comprising defining a search result filter specifying restrictions for displaying search results, the restrictions based on at least one of query syntax, type of article displayed, Uniform Resource Locator, web site from which an article was retrieved, date on which an article was cached and a user-defined relevance metric.

15. The method of claim 14, wherein updating the display of search results responsive to receiving the plurality of search results further comprises filtering the display of search results based on the search result filter.

16. The method of claim 1, wherein updating the display of search results responsive to receiving the plurality of search results further comprises ranking the search results based at least in part on a history of user interactions with previously-displayed search results.

17. The method of claim 16, wherein ranking the search results further comprises ranking the search results based on the user-context attributes.

18. A computer-readable storage medium encoded with executable computer program code for generating multiple implicit search queries, the program code comprising:
   program code for identifying a plurality of events responsive to monitoring real-time user interactions with a client device;
   program code for identifying a plurality of user-context attributes based at least in part on the plurality of events, wherein the plurality of user-context attributes indicate aspects of the real-time user interactions with the client device;
   program code for generating a plurality of implicit search queries comprising terms, wherein the terms are based at least in part on the plurality of user-context attributes;
   program code for receiving a plurality of search results generated responsive to the plurality of implicit search queries; and
   program code for updating a display of search results responsive to receiving the plurality of search results.

19. The computer-readable storage medium of claim 18, wherein the program code for monitoring real-time user interactions with the client device further comprises program code for monitoring multiple types of real-time user interactions with the client device.

20. The computer-readable storage medium of claim 18, wherein at least a first event of the plurality of events comprises one or more words and the program code for identifying the plurality of user-context attributes further comprises program code for extracting a term from the one or more words.

21. The computer-readable storage medium of claim 20, wherein the program code for extracting the term from the one or more words comprises program code for identifying content unique to the one or more words and extracting the term from the unique content.

22. The computer-readable storage medium of claim 21, wherein the program code for identifying the plurality of user-context attributes further comprises program code for generating a term measure based on at least a first frequency that the extracted term occurs in at least one of the one or more words and an index of content.

23. The computer-readable storage medium of claim 22, wherein the program code for generating the plurality of implicit search queries comprising terms further comprises program code for generating a plurality of implicit search queries comprising terms selected responsive at least in part to the term measure.

24. The computer-readable storage medium of claim 18, wherein the program code for generating the plurality of implicit search queries comprising terms further comprises:
   program code for identifying for a user, a user profile comprised of a plurality of user attributes;
   program code for identifying a search term based at least in part on the plurality of user attributes; and
   program code for generating an implicit search query based at least in part on the search term.

25. The computer-readable storage medium of claim 18, wherein the program code for receiving the plurality of implicit search results generated responsive to the plurality of search queries further comprises program code for receiving the plurality of implicit search results responsive to a search of at least one of a local index of content stored on a client device and a global index of content on a network.

26. The computer-readable storage medium of claim 18, wherein the search results comprise a first search result set and the program code for updating a display of search results responsive to receiving the plurality of search results further comprises program code for combining the first result set with a second result set, the second result set comprised of results from previously generated search queries.

27. The computer-readable storage medium of claim 18, further comprising program code for defining a search result filter specifying restrictions for displaying search results, the restrictions based on at least one of query syntax, type of article displayed, Uniform Resource Locator, web site from which an article was retrieved, date on which an article was cached and a user-defined relevance metric.

28. The computer-readable storage medium of claim 27, wherein the program code for updating the display of search results responsive to receiving the plurality of search results further comprises program code for filtering the display of search results based on the search result filter.

29. The computer readable storage medium of claim 18, wherein the program code for updating the display of search results responsive to receiving the plurality of search results further comprises program code for ranking the search results based at least in part on a history of user interactions with previously-displayed search results.

30. A computer system for generating multiple implicit search queries, comprising:
   a memory;
   a processor;
   a monitoring module stored in the memory and executable by the processor to identify a plurality of events responsive to monitoring real-time user interactions with a client device;

a user-context attributes module stored in the memory and executable by the processor to identify a plurality of user-context attributes based at least in part on the plurality of events, wherein the plurality of user-context attributes indicate aspects of real-time user interactions with the client device;

a search query module stored in the memory and executable by the processor to generate implicit search queries comprising terms, wherein the terms are based at least in part on the plurality of user-context attributes;

a search results module stored in the memory and executable by the processor to receive a plurality of search results generated responsive to the plurality of implicit search queries; and a display module stored in the memory and executable by the processor to update a display of search results responsive to receiving the plurality of search results.

31. The system of claim 30, wherein the monitoring module is further executable to monitor multiple types of real-time user interactions with the client device.

32. The system of claim 30, wherein at least a first event of the plurality of events comprises one or more words and the user-context attributes module for identifying the plurality of user-context attributes is adapted to extract a term from the one or more words.

33. The system of claim 32, wherein the user-context attributes module for identifying the plurality of user-context attributes is adapted to generate a term measure based on at least a first frequency that the extracted term occurs in at least one of the one or more words and an index of content.

34. The system of claim 33, wherein the search query module for generating a plurality of implicit search queries comprising terms is further executable to generate a plurality of implicit search queries comprising terms selected responsive at least in part to the term measure.

35. The system of claim 30, wherein the search query module for generating a plurality of implicit search queries comprising terms is executable to:
 identify for a user, a user profile comprised of a plurality of user attributes;
 identify a search term based at least in part on the plurality of user attributes; and
 generate an implicit search query based at least in part on the search term.

36. The system of claim 30, wherein the search results module for receiving the plurality of search results generated responsive to the plurality of search queries is executable to receive the plurality of search results responsive to a search of at least one of a local index of content stored on a client device and a global index of content on a network.

37. The system of claim 30, wherein the search results comprise a first search result set and the display module for updating a display of search results responsive to receiving the plurality of search results is adapted to combine the first result set with a second result set, the second result set comprised of results from previously generated search queries.

38. The system of claim 30, further comprising a filter module for defining a search result filter specifying restrictions for displaying search results, the restrictions based on at least one of query syntax, type of article displayed, Uniform Resource Locator, web site from which an article was retrieved, date on which an article was cached and a user-defined relevance metric.

39. The system of claim 38, wherein the display module for updating the display of search results responsive to receiving the plurality of search results is adapted to filter the display of search results based on the search result filter.

40. The system of claim 30, wherein the display module for updating the display of search results responsive to receiving the plurality of search results is adapted to rank the search results based at least in part on a history of user interactions with previously-displayed search results.

41. The method of claim 1, wherein the event comprises receiving a text buffer and the user-context attribute is the current word in the text buffer.

42. The method of claim 1, wherein the event comprises receiving a text buffer and the user-context attribute comprises one or more words in the text buffer, wherein the one or more words are near a position of a cursor.

43. The method of claim 1, wherein the event comprises receiving a text buffer and the user-context attribute comprises one or more words last input to the text buffer by a user.

44. The method of claim 1, wherein the event comprises receiving a text buffer and the user-context attribute comprises one or more words selected by a user from the text buffer.

* * * * *

UNITED STATES PATENT AND TRADEMARK OFFICE
CERTIFICATE OF CORRECTION

PATENT NO. : 7,664,734 B2 Page 1 of 1
APPLICATION NO. : 10/814908
DATED : February 16, 2010
INVENTOR(S) : Lawrence et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1374 days.

Signed and Sealed this

Thirtieth Day of November, 2010

David J. Kappos
*Director of the United States Patent and Trademark Office*